United States Patent [19]

Pellet et al.

[11] 4,302,358

[45] Nov. 24, 1981

[54] REFORMING WITH AN IMPROVED PLATINUM-CONTAINING CATALYST

[75] Inventors: Regis J. Pellet, Wheaton, Ill.; Ralph J. Bertolacini, Chesterton, Ind.

[73] Assignee: Standard Oil Company (Indiana), Chicago, Ill.

[21] Appl. No.: 86,707

[22] Filed: Oct. 22, 1979

[51] Int. Cl.$^3$ .................. B01J 27/08; B01J 27/10; B01J 23/64
[52] U.S. Cl. ................................ 252/441; 252/442; 252/472; 252/466 PT; 208/138; 208/139
[58] Field of Search ................ 252/441, 442, 466 PT, 252/472

[56] References Cited

U.S. PATENT DOCUMENTS 4,149,962 4/1979 Antos ........................... 252/441 X

FOREIGN PATENT DOCUMENTS 2627822 2/1977 Fed. Rep. of Germany .

*Primary Examiner*—Patrick Garvin

*Attorney, Agent, or Firm*—James L. Wilson; William T. McClain; William H. Magidson

[57] ABSTRACT

There is disclosed a catalyst, which catalyst comprises a physical particle-form mixture of a Component A and a Component B, said Component A comprising at least one Group VIII noble metal deposed on a solid catalyst support material providing acidic catalytic sites and said Component B comprising rhenium or a compound of rhenium deposed on a solid catalyst support material, said catalyst having been prepared by thoroughly blending finely-divided particles of Component A and Component B to provide a thoroughly-blended composite, said finely-divided particles having a particle diameter that is less than 100 mesh (150 microns), and forming said composite into particles having a size that is greater than 100 mesh (150 microns) and being suitable for use in a hydrocarbon conversion reaction zone.

The catalyst can be employed in a process for the reforming of a hydrocarbon stream, which process comprises contacting said stream in a reaction zone under reforming conditions and in the presence of hydrogen with said catalyst.

25 Claims, 10 Drawing Figures

EFFECT OF 15ppm SULFUR ON $C_5+$ YIELDS

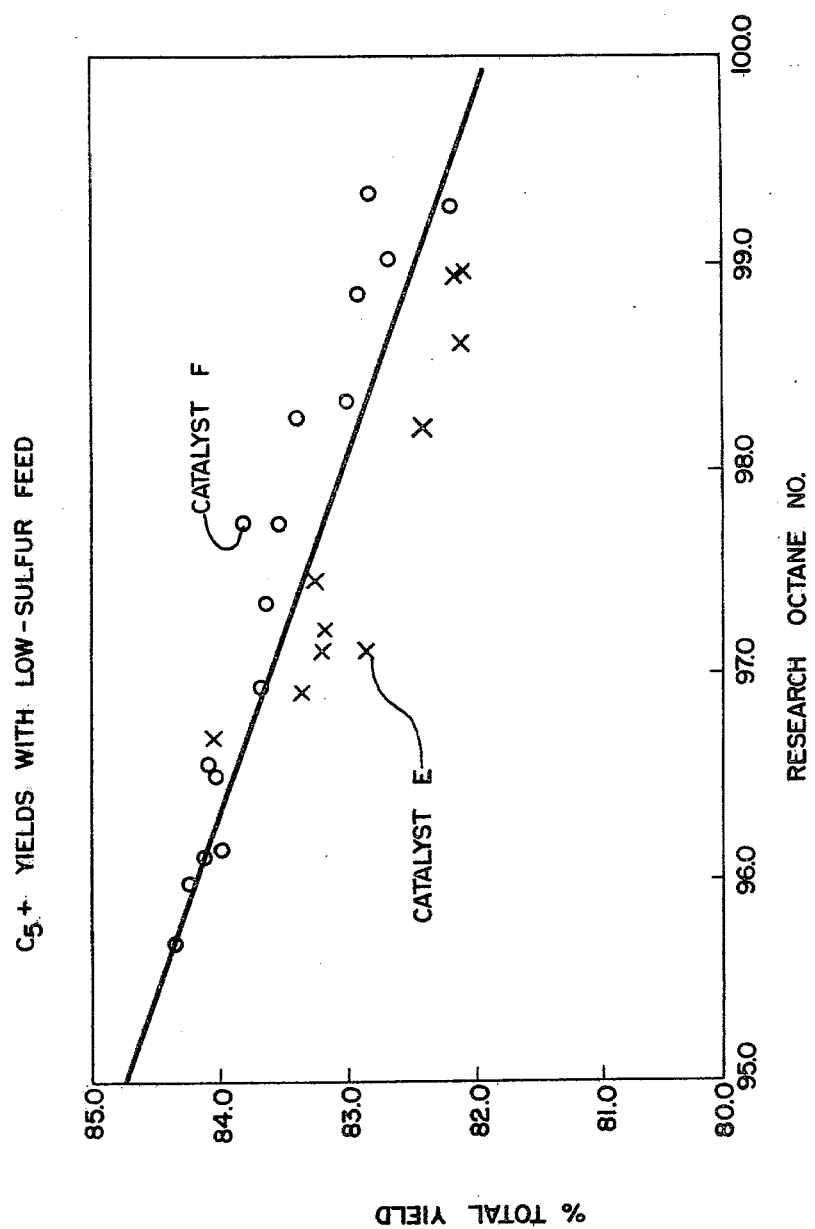

REFORMING WITH AN IMPROVED PLATINUM-CONTAINING CATALYST

BACKGROUND OF THE INVENTION

This invention is related to the conversion of hydrocarbon streams. More particularly, it is related to the reforming of hydrocarbon fractions over catalysts containing platinum and rhenium.

The reforming of hydrocarbon streams is one of the important petroleum refining processes that may be employed to provide high-octane-number hydrocarbon blending components for gasoline. In the typical reforming process, the reactions comprise dehydrogenation reactions, isomerization reactions, and hydrocracking reactions. The dehydrogenation reactions include the dehydrogenation of cyclohexanes to aromatics, the dehydroisomerization of alkylcyclopentanes to aromatics, the dehydrogenation of paraffins to olefins, and the dehydrocyclization of paraffins and olefins to aromatics. The isomerization reactions include isomerization of n-paraffins to isoparaffins, the hydroisomerization of olefins to isoparaffins, the isomerization of alkylcyclopentanes to cyclohexanes, and the isomerization of substituted aromatics. The hydrocracking reactions include hydrocracking of paraffins and hydrodesulfurization. Adequate discussions of the reactions occurring in a reforming reaction zone are presented in CATALYSIS, Vol. VI, P. H. Emmett, editor, Reinhold Publishing Corporation, 1958, pages 497–498, and PETROLEUM PROCESSING, R. J. Hengstebeck, McGraw-Hill Book Company, Inc., 1959, pages 179–184.

It is well known by those skilled in the art that several catalysts are capable of reforming naphthas and hydrocarbons that boil in the gasoline boiling range. Although reforming can be carried out through the use of several types of catalysts, namely, molybdena-on-alumina catalysts, chromium-oxides-on-alumina catalysts, platinum-halogen-on-alumina catalysts, platinum-rhenium-halogen-on-alumina catalysts, and platinum-aluminosilicate-material-alumina catalysts, the catalysts employing platinum as a hydrogenation component and rhenium as a promoter are generally employed today in the reforming processes of the petroleum industry.

Kluksdahl, in U.S. Pat. No. 3,415,737, discloses the platinum-rhenium catalyst and its use for the reforming of hydrocarbon fractions. This catalyst has both platinum and rhenium deposited on the same support material. He provides that the sulfur content of the system should be minimal and that the catalyst should be presulfided to prevent run-away temperatures due to excessive hydrocracking.

It is known in the art that a reforming catalyst may contain more than one Group VIII metal, for example, platinum and palladium. In U.S. Pat. No. 3,173,856, Burton, et al., teach reforming with a catalyst comprising platinum and/or palladium on eta-alumina. In U.S. Pat. No. 3,554,901, Kominami, et al., teach the aromatization of hydrocarbons at a temperature of 400° C. to 650° C. with a catalyst that is prepared by impregnating a carrier, such as silica, alumina, or silica-alumina, with a solution containing 0.1 to 1 wt. % platinum, 0.1 to 1 wt.% palladium, and 5 to 25 wt.% chromium oxide, and treating the impregnated material with hydrogen. In U.S. Pat. No. 3,694,348, Bursian, et al., disclose the aromatization of hydrocarbons at a temperature of 400° C. to 550° C. and a pressure of up to 20 atmospheres over platinum-on-alumina catalyst containing 0.1 to 5 wt.% palladium and 0.1 to 5 wt.% of at least one element from the scandium subgroup of Group III of the Periodic Table of Elements and/or the zirconium subgroup of Group IV. In Example 5 of this latter patent, there is employed a catalyst containing 0.6 wt.% platinum and 0.2 wt.% palladium on alumina.

In U.S. Pat. No. 4,124,490, Collins, et. al., teach reforming that employs a catalyst comprising a support, at least one platinum-group metal component, and at least one rhenium component at two different temperature levels.

In U.S. Pat. No. 4,124,491, Antos, et al., disclose reforming with a selectively sulfided acidic multi-metallic catalyst comprising one or more Group VIII metals, a sulfided rhenium component, a halogen component, and a Ziegler alumina. The patent teaches that the catalyst may contain platinum, iridium, rhodium, or palladium; platinum and iridium; and platinum and rhodium.

The use of mechanical mixtures of components for catalysts is well known. Kittrell, in U.S. Pat. No. 3,535,231, considers a process for the conversion of distillates and solvent-deasphalted residua employing a catalyst consisting of a physical mixture of particles of a first catalyst comprising a layered clay-type crystalline aluminosilicate material and a component selected from rhenium and compounds of rhenium and a second catalyst comprising a layered clay-type crystalline aluminosilicate material, a component selected from Group VIII metals and compounds thereof, and a component selected from a silica-alumina gel, silica-alumina-titania gel, and silica-alumina-zirconia gel. Hydrocracking, hydrodesulfurization, hydrodenitrification, hydrogenation, and hydroisomerization processes are included.

Thorn, et al., in U.S. Pat. No. 2,890,178, disclose a method for preparing a reforming catalyst, wherein an intermediate catalytic concentrate is prepared by impregnating a finely-divided carrier with about 1 to about 35 wt.% of a platinum group metal compound, the intermediate concentrate is dried and a major proportion of a finely-divided, predried, adsorptive metal oxide containing a major proportion of alumina and which is free of platinum group metal is mixed with a minor proportion of the concentrate particles.

Sinfelt, et al., in U.S. Pat. No. 3,346,510, disclose a bifunctional catalyst wherein hydrogenation-dehydrogenation metal has been impregnated on a non-acidic component that has been physically mixed with separate particles comprising an acidic component, for example, a catalyst composed of platinum on alumina physically admixed with particles of hydrogen-form Y-type crystalline aluminosilicate material.

Prater, et al., in U.S. Pat. No. 2,854,404, consider a reforming catalyst that consists essentially of a mechanical mixture of finely-divided particles of a porous inert carrier having deposited thereon a small amount of one or more of the platinum group metals and finely-divided particles of porous eta-alumina having incorporated therein an activating amount of halogen. They consider activated alumina derived from alpha-alumina trihydrate particles which are less than 100 microns in diameter to be a preferred porous inert carrier.

Schwarzenbek, in U.S. Pat. No. 2,897,137, discloses a reforming catalyst comprising a catalyst containing about 1 to about 25 wt.% of platinum supported on a carrier material in physical admixture with a carrier material in an amount sufficient to provide an average platinum concentration of about 0.05 to about 0.95 wt.% in the total mixture. An example is a mixture of alumina and platinum-on-alumina.

Hass, et al., in U.S. Pat. No. 3,619,127, consider a catalyst that can be used for treating automobile exhaust gases, which catalyst comprises a mechanical mixture of discrete particles, part of which contains platinum metal supported on a suitable support and part of which contains Group VI metal oxides supported on the same or a different support. Supports of alumina and silica-alumina are mentioned.

Sinfelt, et. al., in U.S. Pat. No. 3,925,196, disclose a reforming catalyst that comprises alumina and an alumina-supported multi-metallic component comprising one or more Group VIII metals alone or in combination with Group VIIB and/or Group IB metals. In U.S. Pat. No. 3,789,020, the same patentees indicate that the metals are supported on less than about one quarter of the total refractory material to form the supported component and the supported component is admixed with the remaining refractory material. Examples of refractory material are alumina, silicaalumina, crystalline aluminosilicate material, silicamagnesia, and mixtures thereof.

In German Offenlegungsschrift No. P 26 27 822, Roberts, et al., disclose a reforming catalyst consisting of a mechanical mixture of particles of platinum on a first solid support and particles of a rhenium-containing component on a second solid support and a process for reforming heavy gasoline, which process employs such catalyst. They do not provide any restriction or limitation that is directed to particle size or particle size distribution. They do indicate that the platinum-containing particles can also contain one or more catalytic components, such as palladium, iridium, rhodium, gallium, germanium, or tin, or compounds thereof.

There has now been found an improved catalyst for the reforming of petroleum hydrocarbon streams and a reforming process that employs such improved catalyst.

SUMMARY OF THE INVENTION

Broadly, according to the present invention, there is provided an improved catalyst for the reforming of a hydrocarbon stream, which catalyst comprises a physical particle-form mixture of a Component A and a Component B, said Component A comprising at least one Group VIII noble metal deposed on a solid catalyst support material providing acidic catalytic sites and said Component B comprising rhenium or a compound of rhenium deposed on a solid catalyst support material, said catalyst having been prepared by thoroughly and intimately blending finely-divided particles of Component A and Component B to provide a thoroughly-blended composite, said finely-divided particles having a particle diameter that is less than 100 mesh (150 microns) [U.S. Sieve Series], and forming said composite into particles having a size that is greater than 100 mesh (150 microns) and being suitable for use in a hydrocarbon conversion reaction zone. The solid catalyst support materials of Component A and Component B can be the same material or different materials. Suitably, Component A and Component B can employ a support material comprising an alumina and a combined halogen. Preferably, the combined halogen is chlorine and the Group VIII noble metal is platinum. The Group VIII noble metal is present in an amount within the range of about 0.1 wt.% to about 3 wt.%, calculated as the element and based upon the weight of Component A. The rhenium is present in Component B in an amount within the range of about 0.1 wt.% to about 4 wt.%, calculated as the element and based upon the weight of Component B. The halogen is present in an amount within the range of about 0.1 wt.% to about 4 wt.%, calculated as the element and based upon the weight of the catalyst. Component A is present in an amount within the range of about 10 wt.% to about 90 wt.%, based upon the weight of the catalyst.

According to the invention, there is provided a process for the conversion of a hydrocarbon stream. Specifically, there is provided a process for the reforming of a hydrocarbon stream, which process comprises contacting said stream in a reforming zone under reforming conditions and in the presence of hydrogen with the catalyst described hereinabove.

The process can be used advantageously to reform either a hydrocarbon stream that does not contain a substantial amount of sulfur or a stream that contains up to 80 ppm of sulfur.

The process of the present invention is superior to a reforming process employing a conventional platinumrhenium catalyst, i.e., a catalyst having both metals on a single particle, when reforming a hydrocarbon stream containing more than 1 ppm (by wt.) sulfur.

BRIEF DESCRIPTION OF THE DRAWINGS

FIGS. 8, 9, and 10 present the octane-number decline, aromatics yields, and $C_5+$ yields, respectively, obtained with a catalyst that had been prepared by compositing −100-mesh particles, i.e., particles that pass through a 100-mesh screen (U.S. Sieve Series), and with a prior-art catalyst, when reforming a low-sulfur feed.

Figure 1:
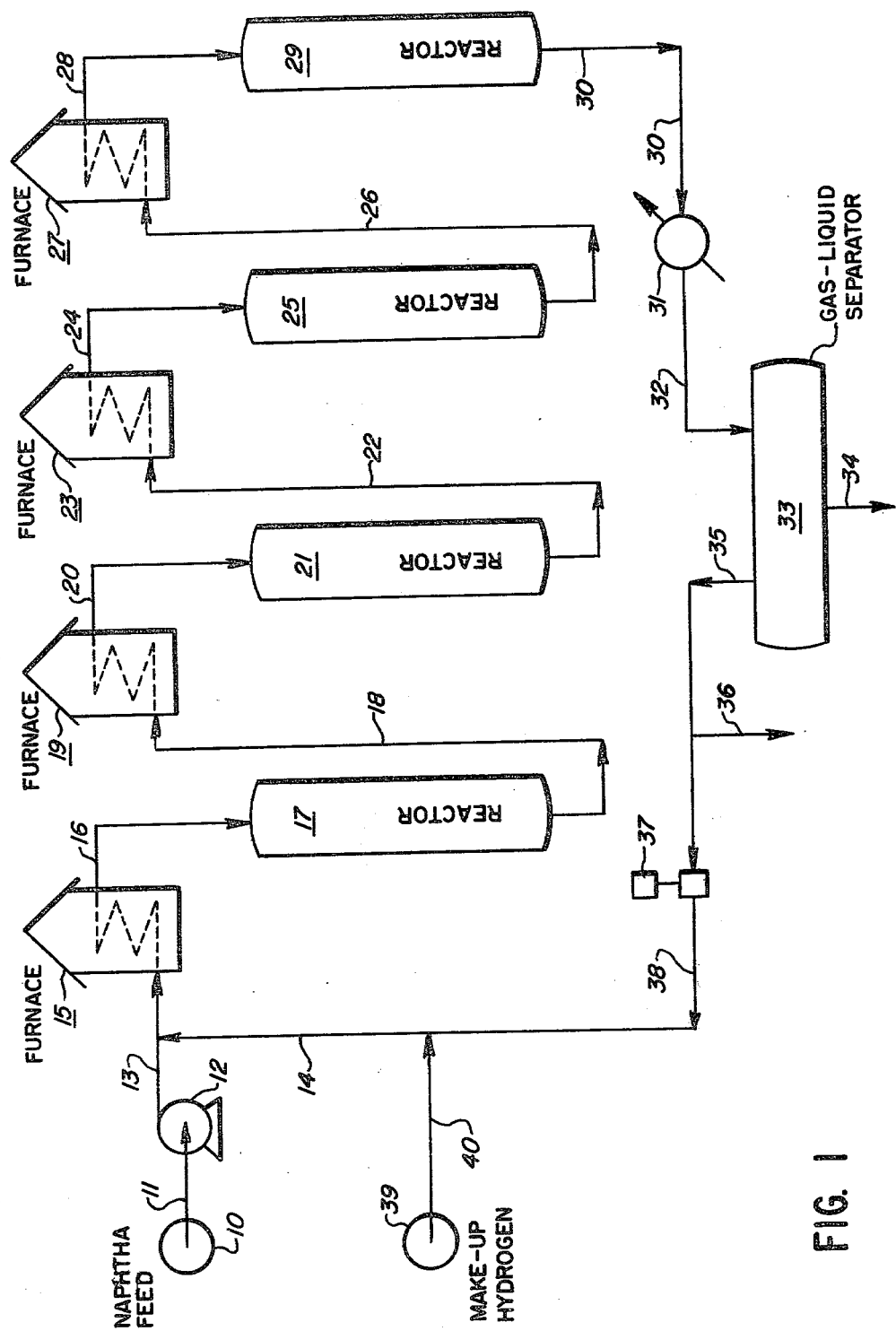
FIG. 1 presents a simplified schematic flow diagram of a preferred embodiment of the process of the present invention, wherein the improved catalyst of the present invention is employed.

The lines drawn in the various figures were obtained by linear regression of the data points excluding any point that obviously did not conform with the majority of points. All of the data points are listed in the appropriate tables hereinafter.

DESCRIPTION AND PREFERRED EMBODIMENTS

The highly mechanized society of today requires an increasing demand for very-high-octane-number motor fuels. One of the chief processes for achieving such motor fuels is the reforming process. Typically, the reforming process of today is a process that employs a catalyst containing both platinum and rhenium as active metal components thereof. Such catalysts provide relatively long catalyst life interspersed with infrequent regenerations.

The process of the present invention is especially advantageous for the production of high-octane-number blending components for motor fuels by means of the reforming of naphthas and other hydrocarbon streams boiling in the gasoline boiling range. It can be employed suitably to produce high-octane-number blending components for unleaded and/or low-lead motor fuels.

The process of the present invention can be employed to reform a feedstock which is a member selected from the group consisting of a virgin naphtha, a cracked naphtha, a hydrocarbon fraction boiling in the gasoline boiling range, and mixtures thereof. It may also be used to reform partially-reformed naphthas and other hydrocarbon streams. A naphtha will exhibit a boiling range of about 70° F. (21.1° C.) to about 500° F. (260° C.), preferably, about 180° F. (82° C.) to about 400° F. (204° C.). The gasoline boiling range comprises temperatures of about 120° F. (49° C.) to about 420° F. (216° C.), preferably, about 140° F. (60° C.) to about 380° F. (193° C.). The partially-reformed hydrocarbon streams will exhibit an unleaded research octane number within the range of about 75 to about 95. As used herein, the term "partially-reformed" refers to those streams that have been reformed to an unleaded research octane number of about 75 to about 95.

Since many of the above feedstocks may contain appreciable amounts of nitrogen and sulfur compounds, which can be deleterious to the catalyst in a reforming process, such feedstock is often subjected to a suitable hydrodesulfurization and/or hydrodenitrogenation treatment, such as hydrofining, prior to the use of that particular feedstock in the process of the present invention. Such treatment reduces both the nitrogen and sulfur levels to tolerable limits. However, it is to be emphasized that the process of the present invention can be used suitably to reform a hydrocarbon stream that contains as much as 80 ppm of sulfur by weight. The process can be used preferably to reform a hydrocarbon stream that contains as much as 15 ppm sulfur by weight.

Typical catalysts that can be used in the hydrodesulfurization and/or hydrodenitrogenation treatment comprise a suitable hydrogenation component, such as a Group VIB metal of the Periodic Table of Elements and/or a Group VIII metal of the Periodic Table of Elements, deposed on a suitable non-acidic or weakly-acidic support material, such as catalytically active alumina. The Periodic Table of Elements referred to herein is the Periodic Table that appears on page 628 of WEBSTER'S SEVENTH NEW COLLEGIATE DICTIONARY, G. & C. Merriam Company, Springfield, Massachusettes, U.S.A. (1963). Typical hydrogenation components are present in the elemental form, as oxides of the metals, as sulfides of the metals, or mixtures thereof. Examples of these pretreatment catalysts are compounds of cobalt and molybdenum on alumina and compounds of nickel and molybdenum on alumina.

Operating conditions for the hydrodesulfurization and/or hydrodenitrogenation treatment comprise an average temperature within the range of about 600° F. (316° C.) to about 750° F. (399° C.); a pressure within the range of about 200 psig (1,480 KPa) to about 500 psig (3,546 KPa); a liquid hourly space velocity (LHSV) within the range of about 1 volume unit of hydrocarbon per hour per volume unit of catalyst to about 5 volume units of hydrocarbon per hour per volume unit of catalyst; a hydrogen-to-hydrocarbon mole ratio within the range of about 1 to about 5; and a hydrogen addition rate within the range of about 100 standard cubic feet of hydrogen per barrel of hydrocarbon (SCFB) [17.8 $m^3/m^3$] to about 500 SCFB (89.0 $m^3/m^3$).

Broadly, according to the present invention, there is provided an improved catalyst for the conversion of hydrocarbon streams. This catalyst comprises a physical particle-form mixture of a Component A and a Component B, said Component A comprising at least one Group VIII noble metal deposed on a solid catalyst support material providing acidic catalytic sites and said Component B comprising rhenium or a compound of rhenium deposed on a solid catalyst support material, said catalyst having been prepared by thoroughly and intimately blending finely-divided particles of Component A and Component B to provide a thoroughly-blended composite, said finely-divided particles having a particle diameter that is less than 100 mesh (150 microns), and forming subsequently said composite into particles having a size that is greater than 100 mesh (150 microns) and being suitable for use in a hydrocarbon conversion reaction zone.

Suitable Group VIII noble metals that can be used in Component A are platinum, palladium, rhodium, ruthenium, and iridium. The preferred Group VIII noble metal is platinum. One or more Group VIII noble metals can be employed. The Group VIII noble metal is present in an amount within the range of about 0.1 wt.% to about 3 wt.%, calculated as the element and based upon the weight of Component A. Preferably, the Group VIII noble metal is present in an amount within the range of about 0.4 wt.% to about 2 wt.%, calculated as the element and based upon the weight of Component A.

The rhenium is present in Component B in an amount within the range of about 0.1 wt.% to about 4 wt.%, calculated as the element and based upon the weight of Component B. Preferably, the rhenium is present in an amount within the range of about 0.2 wt.% to about 3 wt.%, calculated as the element and based upon the weight of Component B.

The catalyst support materials for Component A and Component B can be the same materials or can be different materials. A typical support material comprises an alumina and a combined halogen. Such support material can be used for either Component A or Component B. The combined halogen can be combined chlorine or combined fluorine. Preferably, the combined halogen is combined chlorine. The combined halogen is present in an amount within the range of about 0.1 wt.% to about 4 wt.%, calculated as the element and based upon the weight of the catalyst. Preferably, the combined halogen is present in an amount within the range of about 0.4 wt.% to about 1.5 wt.%, calculated as the element and based upon the weight of the catalyst.

A typical refractory inorganic oxide that can be used as a support material is a catalytically active alumina, such as gamma-alumina, eta-alumina, or mixtures thereof. Such alumina should have an average pore diameter of about 70 Angstrom units [A] (7 nm) to about 200 A (20 nm), or larger. The alumina should have a surface area of at least 150 m²/gm. Suitably, the surface area of the alumina should be within the range of about 200 m²/gm to about 800 m²/gm.

The catalyst of the present invention can be prepared typically by first forming Component A and Component B, thoroughly and intimately blending finely-divided particles of Component A and Component B to provide a thoroughly-blended composite, and forming said composite into particles that are suitable for use in a hydrocarbon conversion reaction zone. Component A is prepared by incorporating a Group VIII noble metal into a catalyst support material by impregnation of the support material or by addition of a soluble compound of the metal to a sol or gel of the support material, if a refractory inorganic oxide, thoroughly blending the mixture, co-gelling the mixture, drying, and calcining. If a combined halogen is to be employed, it can be added in a similar manner. If both the Group VIII noble metal and the combined halogen are used, the halogen can be added prior to, after, or simultaneously with the Group VIII noble metal. Similar techniques may be employed in the preparation of Component B for the addition of rhenium and combined halogen, if used. Therefore, for either component, soluble compounds of the various metal(s) and the halogen can be added to a sol or gel of the refractory inorganic oxide. This composition is thoroughly blended and the sol or gel mixture is subsequently co-gelled by the addition of a dilute ammonia solution. The resulting co-gelled material is then dried and calcined. In another method of preparation of either component, the refractory inorganic oxide is gelled, dried, calcined, and cooled, and the resulting material is then impregnated with one or more solutions of the various metal components and the halogen. Suitable calcination conditions comprise a temperature in the range of about 900° F. (482° C.) to about 1,100° F. (593° C.) and a calcination time of about 1 hour to about 20 hours. Suitable drying conditions comprise a temperature in the range of about 200° F. (93° C.) to about 400° F. (204° C.) and a drying time of about 3 hours to about 30 hours. Preferably, drying conditions comprise a temperature of about 250° F. (121° C.) for about 8 hours to about 16 hours and calcination conditions comprise a temperature of about 1,000° F. (538° C.) for about 2 hours to about 6 hours. The combined halogen may be incorporated into the catalyst as a halide of a metal, or as a halogen acid, or as a halide salt.

A mechanical mixture of finely-divided particles of Component A and Component B is prepared. Appropriately sized particles of each component, i.e., particles having a diameter that is less than 100 mesh [U.S. Sieve Series] (150 microns), are added to one another and are thoroughly blended to form a thoroughly-blended composite, which in turn is formed into particles that are suitable for use in a hydrocarbon conversion reaction zone. Typically, the latter particles have a size that is greater than 100 mesh [U.S. Sieve Series] (150 microns). The particles of Component A and Component B can be thoroughly and intimately blended by using techniques, such as mulling or ball-milling, which are well known in the art.

A suitable procedure for making such a finished catalyst comprises forming cylindrical pellets from the thoroughly-blended composite by extrusion, and charging the extruded pellets into a Marumerizer, wherein the pellets are transformed into uniform-sized spheres by means of a rolling motion resulting from centrifugal force and friction.

The Marumerizer (a registered trademark) is a machine consisting of a non-movable bowl inside of which bowl is a specially machined rotating friction plate. It can be obtained from Elanco Products Company, Equipment Sales Department, a Division of Eli Lilly and Company.

It is to be understood that the use of a Marumerizer is suggested solely for illustrative purposes and is not intended to limit the scope of the present invention. Other methods known in the art can be used to form larger particles comprising a thoroughly-blended composite of smaller particles. The larger particles can be made in the shape of extrudates, pills, pellets, beads, spheres, or other shaped particles of the desired size.

The catalyst of the present invention can be used for the conversion of hydrocarbon streams. Specifically, it can be used to reform hydrocarbon streams.

Broadly, according to the present invention, there is provided an improved process for reforming a hydrocarbon stream. This process comprises contacting the hydrocarbon stream under reforming conditions and in the presence of hydrogen with a catalyst which comprises a physical particle-form mixture of a Component A and a Component B, said Component A comprising at least one Group VIII noble metal deposed on a solid catalyst support material providing acidic catalytic sites and said Component B comprising rhenium or a compound of rhenium deposed on a solid catalyst support material, said catalyst having been prepared by thoroughly and intimately blending finely-divided particles of Component A and Component B to provide a thoroughly-blended composite, said finely-divided particles having a particle diameter that is less than 100 mesh (150 microns), and forming subsequently said composite into particles having a size that is greater than 100 mesh (150 microns) and being suitable for use in a hydrocarbon conversion reaction zone.

Typical operating conditions that can be used in the reforming process of the present invention comprise an inlet temperature of about 900° F. (482° C.) to about 1,020° F. (549° C.), a pressure of about 50 psig (446 KPa) to about 1,000 psig (6,996 KPa), a weight hourly space velocity (WHSV) of about 0.5 weight unit of hydrocarbon per hour per weight unit of catalyst to about 10 weight units of hydrocarbon per hour per weight unit of catalyst, and a hydrogen addition rate of about 1,500 standard cubic feet per barrel [SCFB] (267 m³/m³) to about 15,000 SCFB (2,670 m³/m³). Preferred operating conditions comprise an inlet temperature of about 940° F. (504° C.) to about 980° F. (527° C.), a pressure of about 50 psig (446 KPa) to about 300 psig (2,170 KPa), a WHSV of about 1 weight unit of hydrocarbon per hour per weight unit of catalyst to about 8 weight units of hydrocarbon per hour per weight unit of catalyst, and a hydrogen addition rate of about 3,000 SCFB (534 m³/m³) to about 10,000 SCFB (1,780 m³/m³).

The process of the present invention can be carried out in any of the conventional types of equipment known in the art. One may, for example, employ catalysts in the form of pills, pellets, granules, broken fragments, or various special shapes, disposed as one or more fixed beds within one or more reaction zones, and the charging stock may be passed therethrough in the liquid, vapor, or mixed phase, and in either upward or downward flow. Alternatively, the catalyst may be in a suitable form for use in moving beds, in which the charging stock and catalyst are preferably passed in countercurrent flow; or in fluidized-solid processes, in which the charging stock is passed upward through a turbulent bed of finely-divided catalyst; or in the suspensoid process, in which the catalyst is slurried in the charging stock and the resulting mixture is conveyed into the reaction zone. A fixed-bed reforming process is exemplified by Ultra-forming (PETROLEUM ENGINEER, Vol. XXVI, No. 4, April, 1954, at page C-35). The reaction products from the foregoing processes are removed from the reaction zones and fractionated to recover the various components thereof. The hydrogen and unconverted materials are recycled as desired, the excess hydrogen produced in a reformer conveniently being utilized in the hydrodesulfurization of the feed, if such hydrodesulfurization is needed.

The catalyst the present invention is presulfided to minimize initial hydrocracking.

Unwanted products in the reforming of petroleum hydrocabon streams are light hydrocarbon gases and coke. Such products and other compounds, such as polynuclear aromatics and heavy hydrocarbons, may result in coke. As the operation progresses, a substantial amount of coke accumulates on the surface of the catalyst resulting in an increasingly rapid rate of catalyst deactivation. Consequently, the coke must be removed periodically from the surface. Such coke removal may be accomplished through a coke-burn treatment wherein the coked catalyst is contacted with an oxygen-containing gas at selected temperatures. Typically, the gas will contain oxygen within the range of about 1 vol.% to about 21 vol.%. The concentration of oxygen in the gas should be maintained at a level which will result in the production of temperatures that will not be in excess of 1,100° F. (593° C.), preferably, not in excess of 1,050° F. (566° C.).

Typically, the process of the present invention can be employed as a semi-regenerative reforming process or as a regenerative or cyclic process. In a semi-regenerative reforming process, the flow of hydrocarbons is stopped to all of the reactors in the system and the catalyst in each of the reactors is regenerated. In a regenerative or cyclic reforming system, one of the reactors is removed from the system and is replaced by an auxiliary reactor. Reforming of hydrocarbons continues in such a system, while catalyst in the reactor that has been removed from the system is regenerated. The auxiliary reactor is known as a swing reactor.

A preferred embodiment of the process of the present invention is depicted in the accompanying FIG. 1. This figure is a simplified schematic flow diagram of the preferred embodiment. It does not include certain auxiliary equipment, such as heat exchangers, valves, pumps, compressors, and associated equipment, which would be needed in various places along the flow path of the process in addition to the pump and compressor that are depicted in the drawing. Such additional auxiliary equipment and its location requirements would be quickly recognized by one having ordinary skill in the art. Consequently, such auxiliary equipment is not shown in the figure.

In the embodiment of the process of the present invention that is represented in the accompanying FIG. 1, a naphtha having a boiling range of a bout 160° F. (71° C.) to about 400° F. (204° C.), preferably, about 180° F. (82° C.) to about 380° F. (193° C.), is obtained from source 10. This naphtha contains 15 ppm sulfur. However, it could satisfactorily contain sulfur in an amount within the range of 0 ppm to about 80 ppm. This feedstock is passed through line 11 into pump 12, which pumps the hydrocarbons through line 13. Hydrogen-containing recycle gas is introduced into line 13 via line 14 to be mixed with the hydrocarbons in line 13. The resulting hydrogen-hydrocarbon mixture passes through line 13, furnace 15, and line 16 into the top of reactor 17. The material is introduced into reactor 17 at a temperature of about 940° F. (504° C.) to about 980° F. (527° C.). The outlet temperature of reactor 17 is approximately 800° F. (427° C.) and the pressure in reactor 17 is within the range of about 160 psig (1,205 KPa) to about 320 psig (2,308 KPa).

The effluent from reactor 17 passes through line 18, furnace 19, and line 20 into the top of reactor 21. Sufficient heat is introduced into this hydogen-hydrocarbon stream by furnace 19 so that the temperature at the inlet of reactor 21 is about 960° F. (516° C.) to about 1,000° F. (538° C.). The outlet temperature of reactor 21 is approximately 855° F. (457° C.) and the pressure in reactor 21 is within the range of about 140 psig (1,067 KPa) to about 300 psig (2,170 KPa).

The effluent from reactor 21 passes through line 22, furnace 23, and line 24 into the top of reactor 25. This effluent is heated in furnace 23 so that the inlet temperature of reactor 25 is about 960° F. (516° C.) to about 1,000° F. (538° C.). The outlet temperature of reactor 25 is approximately 940° F. (504° C.) and the pressure in reactor 25 is within the range of about 120 psig (929 KPa) to about 280 psig (2,032 KPa).

The effluent from reactor 25 passes through line 26, furnace 27, and line 28 into the top of reactor 29. This hydrocarbon effluent is heated in furnace 27 so that the inlet temperature of reactor 29 is about 980° F. (527° C.) to about 1,020° F. (549° C.). The outlet temperature of reactor 29 is about 950° F. (510° C.) and the pressure in reactor 29 is within the range of about 100 psig (791 KPa) to about 260 psig (1,894 KPa).

Reactors 17, 21, 25, and 29 all contain a catalyst which has been presulfided and which comprises a physical particle-form mixture of a Component A and a Component B, said Component A comprising about 0.1 wt.% to about 3 wt.% platinum and about 0.1 wt.% to about 4 wt.% combined chlorine deposed on gamma-alumina and said Component B comprising about 0.1 wt.% to about 4 wt.% rhenium and about 0.1 wt.% to about 4 wt.% combined chlorine deposed on gamma-alumina, said Component A and Component B being present in equal amounts. In this case, the two components would contain the same amount of combined chlorine. The amounts of the metals and the combined chlorine are expressed in terms of the elements and are based upon the weight of the particular component. The particles are 1/16-inch × 1/16-inch pellets.

Not shown in the figure is a fifth reactor, which reactor contains a quantity of the catalyst that is employed in the other reactors. This additional reactor is employed as a swing reactor for each of the four reactors in this system, when the catalyst in a particular reactor has become deactivated and must be regenerated. The reactor containing this deactivated catalyst is removed from the system and is replaced by the swing reactor in order that the reforming system may be operated continuously, even though the deactivated catalyst has been removed from the system and is being regenerated.

The hydrogen-to-hydrocarbon ratio and the WHSV employed in the various reactors fall within the respective ranges and values as expressed hereinabove.

The effluent from reactor 29 passes through line 30, water cooler 31, and line 32 into gas-liquid separator 33. Gas-liquid separator 33 is operated at a pressure of about 80 psig (653 KPa) to about 240 psig (1,756 KPa) and at a temperature of about 100° F. (38° C.). Liquid product is removed from separator 33 through line 34 to be sent to a suitable product recovery system from which a high-octane product is obtained. Gaseous material is removed from separator 33 through line 35. A portion of this gas is removed from the system through line 36 to be used at other refinery units. The remainder of the hydrogen-hydrocarbon gas in line 35 is compressed by compressor 37 to be sent through lines 38 and 14 as hydrogen-hydrocarbon recycle gas. When necessary, make-up hydrogen gas may be introduced into the system from source 39 via line 40.

It is contemplated that in a second embodiment of the process of the present invention, which second embodiment can be represented also by the simplified schematic flow diagram depicted in FIG. 1, two catalysts are employed. In this second embodiment, Reactors 17 and 21 contain a first catalyst, which first catalyst comprises about 0.05 wt.% to about 1 wt.% platinum and about 0.1 wt.% to about 1 wt.% combined halogen, preferably, chlorine, on an alumina carrier, and Reactors 25 and 29 contain a second catalyst, which second catalyst is an embodiment of the catalyst of the process of the present invention as described hereinabove. The swing reactor (not shown) employs either the second catalyst or a mixture of the two catalysts. The operating conditions employed in this embodiment fall within the ranges of values set forth hereinabove. In this latter embodiment, either a virgin naphtha or a partially-reformed hydrocarbon stream may be employed as the hydrocarbon feedstock.

Accordingly, there is provided an improved process for the reforming of a hydrocarbon stream selected from the group consisting of naphthas and hydrocarbon fractions boiling in the gasoline boiling range, which process comprises contacting said hydrocarbon stream under reforming conditions and in the presence of hydrogen with a catalyst which comprises a physical particle-form mixture of a Component A and a Component B, said Component A comprising at least one Group VIII noble metal and a combined halogen deposed on alumina and said Component B comprising rhenium and combined halogen deposed on alumina, said catalyst having been prepared by thoroughly and intimately blending finely-divided particles of Component A and Component B to provide a thoroughly-blended composite, said finely-divided particles having a particle diameter that is less than 100 mesh (150 microns), and forming subsequently said composite into particles having a size that is greater than 100 mesh (150 microns) and being suitable for use in a hydrocarbon conversion reaction zone.

The followng examples are presented to facilitate a better understanding of the present invention. They are presented for the purpose of illustration only and are not intended to limit the scope of the present invention.

EXAMPLE I

Catalyst A and Catalyst B were prepared. Each of these catalysts comprised a mixture of a component having platinum and combined chlorine deposited on alumina and a component having rhenium and combined chlorine on alumina. However, Catalyst A was prepared by blending together 20/45-mesh particles, i.e., particles that will pass through a 20-mesh screen (U.S. Sieve Series) but will be retained upon a 45-mesh screen (U.S. Sieve Series), while Catalyst B was prepared by blending together −100-mesh particles, i.e., particles that will pass through a 100-mesh screen (U.S. Sieve Series).

Components comprising platinum and combined chlorine on alumina were prepared for Catalyst A and Catalyst B. A first portion of Aero-1000 alumina in the form of 1/12-inch extrudates, obtained frm the American Cyanamid Company, was ground to pass through a 20-mesh screen (U.S. Sieve Series). The resulting powder was then sieve and two fractions were retained for further use. These two fractions were a 20/45-mesh fraction, and a −100-amesh fraction. The two fractions were then blended to give a composite that contained 100 gm of 20/45-mesh material and 485 gm of −100-mesh material. This blend of alumina particles was impregnated with a solution that had been prepared by dissolving 11.9 gm of chloroplatinic acid ($H_2PtCl_6$), containing 40 wt.% platinum, and 2.05 gm of a concentrated hydrochloric acid solution, containing 36.5 wt.% chlorine, in 468 gm of distilled water. The impregnted material was then dried and calcined. Unless specified otherwise for a preparation discussed in these examples, drying was performed overnight (approximately 16 hr) in static air at a temperature of 250° F. (121° C.) and calcination was conducted in air at a temperature of 1,000° F. (538° C.) for 3 hr. The calcined material was sieved to obtain a 20/45-mesh fraction and a −100-mesh fraction. The 20/45-mesh fraction is identified hereinafter as Component 1 and the −100-mesh fraction is identified hereinafter as Component 2. Component 1 and Component 2 were prepared to contain 0.8 wt.% platinum and 0.8 wt.% combined chlorine on alumina.

Components comprising rhenium and combined chlorine on alumina were prepared for Catalyst A and Catalyst B. A second portion of Aero-1000 alumina, obtained from the American Cyanamid Company, in the form of 1/12-inch extrudates, was employed and, as was done hereinabove, a blend of 485 gm of −100-mesh alumina particles and 100 gm of 20/45-mesh alumina particles was prepared. The blend was impregnated subsequently with a solution that had been prepared by dissolving 8.95 gm of perrhenic acid solution ($HReO_4$), which contained 52.3 wt.% rhenium, and 16.03 gm of concentrated hydrochloric acid solution in 439 gm of distilled water. The impregnated material was dried and calcined. The calcined material was sieved to obtain a 20/45-mesh fraction and a −100-mesh fraction. The 20/45-mesh fraction is identified hereinafter as Component 3 and the −100-mesh fraction is identified hereinafter as Component 4. Both of these components were prepared to contain 0.8 wt.% rhenium and 0.8 wt.% combined chlorine.

Catalyst A was prepared by blending together equal amounts (10 gm) of Component 1 and Component 3. This composite was prepared to contain 0.4 wt.% platinum, 0.4 wt.% rhenium, and 0.8 wt.% combine chlorine, based upon the weight of the composite.

Catalyst B was prepared by blending together equal amounts (300 gm) of Component 2 and Component 4. The blending was accomplished by tumbling the mixture of Component 2 and Component 4 for 1 hr to ensure close contact between the two catalytic materials. Subsequently, this blend was formed into larger particles in the form of spheres by Marumerizing the blend.

The spheres were dried and calcined. The calcined spheres were then ground and sieved to obtain a 20/45-mesh material for catalyst testing. Catalyst B was prepared to contain 0.4 wt.% platinum, 0.4 wt.% rhenium, and 0.8 wt.% combined chlorine, based upon the weight of the composite.

EXAMPLE II

Catalyst C was prepared. It also comprised a mixture of a component having platinum and combined chlorine deposited on alumina and a component having rhenium and combined chlorine deposited on alumina. However, Catalyst C was prepared by blending together −325-mesh particles, i.e., particles that will pass through a 325-mesh screen (U.S. Sieve Series).

Another portion of Aero-1000 alumina in the form of 1/12-inch extrudates, obtained from the American Cyanamid Company, was crushed and sieved to obtain a material that would pass through a 325-mesh screen (U.S. Seive Series). A 200-gm portion of this ground material was impregnated with a solution that had been prepared by dissolving 4.1 gm of chloroplatinic acid and 0.70 gm of concentrated hydrochloric acid solution in 160 gm of distilled water. The impregnated material was dried and calcined. The calcined material is identified hereinafter as Component 5. A second 200-gm portion of this −325-mesh material was impregnated with a solution that had been prepared by dissolving 3.1 gm of a perrhenic acid solution and 5.48 gm of concentrated hydrochloric acid solution in 160 gm of distilled water. This second impregnated material was dried and calcined. The calcined material is identified hereinafter as Component 6.

Equal amounts (175 gm) of Component 5 and Component 6 were blended together and composited as described for Catalyst B hereinabove in Example I. The resulting spheres were ground and sieved to obtain a 20/45-mesh material, which is hereinafter identified as Catalyst C. Catalyst C was prepared to contain 0.4 wt.% platinum, 0.4 wt.% rhenium, and 0.8 wt.% chlorine, based upon the weight of Catalyst C.

EXAMPLE III

Catalyst D was prepared by blending together 100/325-mesh particles, i.e., particles that will pass through a 100-mesh screen (U.S. Sieve Series) but will be retained on a 325-mesh screen (U.S. Sieve Series).

A portion of Aero-1000 alumina in the form of 1/12-inch extrudates, obtained from the American Cyanamid Company, was ground and sieved to obtain 100/325-mesh particles. A 300-gm portion of this 100/325-mesh material was impregnated with a solution that had been prepared by dissolving 6.1 gm of chloroplatinic acid and 1.9 gm of concentrated hydrochloric acid solution in 240 gm of distilled water. The impregnated material was dried and calcined. The calcined material is identified hereinafter as Component 7. A second 300-gm portion of the 100/325-mesh material was impregnated with a solution that had been prepared by dissolving 4.59 gm of perrhenic acid and 9.04 gm of concentrated hydrochloric acid solution in 240 gm of distilled water. This second impregnated material was dried and calcined and the calcined material is identified hereinafter as Component 8.

Equal amounts (275 gm) of Component 7 and Component 8 were blended together and composited as described for Catalyst B in Example I hereinabove. The resulting spheres were ground and sieved to obtain a 20/45-mesh material, which is hereinafter identified as Catalyst D. Catalyst D was prepared to contain 0.4 wt.% platinum, 0.4 wt.% rhenium, and 0.8 wt.% combined chlorine, based upon the weight of Catalyst D.

EXAMPLE IV

Catalyst E was prepared by employing a Aero-type spray-dried alumina obtained from the American Cyanamid Company. This spray-dried alumina was sieved in order to ascertain its particle size distribution. This alumina was found to contain 65 wt.% 100/325-mesh particles and 35 wt.% −325-mesh particles.

A 700-gm first portion of this spray-dried alumina was impregnated with a solution that had been prepared by dissolving 14.23 gm of chloroplatinic acid and 6.3 gm of concentrated hydrochloric acid solution in 560 gm of distilled water. This first impregnated material was dried and calcined and the calcined material is identified hereinafter as Component 9.

A second 700-gm portion of the spray-dried alumina was impregnated with a solution that had been prepared by dissolving 10.7 gm of a perrhenic acid solution and 23.0 gm of concentrated hydrochloric acid solution in 560 gm of distilled water. The resulting impregnated material was dried and calcined and the calcined material is identified hereinafter as Component 10.

Equal amounts (600 gm) of Component 9 and Component 10 were blended together and were composited to spheres as described for Catalyst B in Example I hereinabove. These spheres were dried and calcined. They had a particle size of 6/10-mesh (U.S. Sieve Series), i.e., the particles will pass through a 6-mesh screen (U.S. Sieve Series) but will be retained on a 10-mesh screen (U.S. Sieve Series). The calcined material is identified hereinafter as Catalyst E. Catalyst E was prepared to contain 0.4 wt.% platinum, 0.4 wt.% rhenium, and 0.8 wt.% combined chlorine.

Each of the above catalysts was tested for its ability to reform a Midcontinent naphtha. These tests are described in the following examples.

EXAMPLE V

Each of the above-described Catalysts A, B, C, and D was tested in bench-scale pilot units for its ability to reform one to two feedstocks, namely, Feed A, which was essentially free of sulfur (about 1 ppm sulfur) and was a desulfurized Midcontinent naphtha, and Feed B, which was the same naphtha containing 80 ppm sulfur added in the form of thiophene. The properties of Feed A are presented hereinafter in Table I.

TABLE I

| PROPERTIES OF FEED A | | |
|---|---|---|
| Gravity, °API | 55.7 | |
| Specific gravity | 0.7559 | |
| Coulometric Sulfur, ppm (average) | 1.6 | |
| Coulometric Nitrogen, ppm | 0.1 | |
| Coulometric chlorine, ppm (average) | 4.5 | |
| Hydrocarbon type, vol. % | | |
| Paraffins | 52.6 | |
| Naphthenes | 33.2 | |
| Aromatics | 14.2 | |
| Research Octane Number (Clear) | 50.4 | |
| ASTM Distillation, °F. (°C.) | | |
| IBP | 160 | ( 71) |
| 5% | 224 | (106) |
| 10% | 234 | (112) |
| 20% | 244 | (118) |
| 30% | 254 | (123) |
| 40% | 258 | (126) |
| 50% | 268 | (131) |

TABLE I-continued

| PROPERTIES OF FEED A | | |
|---|---|---|
| 60% | 276 | (136) |
| 70% | 286 | (141) |
| 80% | 296 | (147) |
| 90% | 308 | (153) |
| 95% | 318 | (159) |
| EBP | 376 | (191) |

Each test was conducted in a bench-scale test unit employing an isothermal fixed bed of catalyst. The hydrocarbon Feedstock and bottled hydrogen (once-through) were mixed and the resulting hydrogen-hydrocarbon mixture was charged to a reactor having an inside diameter of 0.622 inch. The reactor, which was 20 inches long, was immersed in a hot salt bath containing DuPont HITEC. The temperatures in the reactor were determined by employing a manually-operated concentric thermocouple, which was movable along the length of the reactor. The hydrocarbon feed was pumped by a positive-displacement Ruska pump. The liquid product was collected in a high-pressure receiver and was weighed and analyzed on a Hewlett-Packard research chromatograph, Model 5830A. The gas yield was measured by wet test meter and analyzed with a Varian Aerograph chromatograph, Series 1200. Research octane numbers were estimated by mass spectrometry.

Each catalyst was charged to a reactor in the form of 20/45-mesh (U.S. Sieve Series) material. The catalyst bed was supported on a layer of 6.2 cc of 3.0 mm glass beads.

After the reactor containing the catalyst was placed in the test unit, the catalyst was pretreated. The pretreatment comprised subjecting the catalyst to an air soak for 1 hr at a temperature of 930° F. (499° C.) and an air flow rate of 0.0085 ft$^3$/hr (0.000241 m$^3$/hr) followed by a nitrogen purge and a sulfiding treatment, and then reducing the catalyst with hydrogen for 1 hr at test pressure and a temperature of 930° F. (499° C.) at a hydrogen flow rate of 1.95 ft$^3$/hr (0.0552 m$^3$/hr). The sulfiding was conducted for 1 minute by means of a gas mixture comprising 8 vol % hydrogen sulfide in hydrogen at a temperature of 930° F. (499° C.) and a pressure of 390 psig (2,792 KPa). After the sulfiding treatment, the reactor was purged with nitrogen and the hydrogen flow was re-established at a flow rate of 1.95 ft$^3$/hr (0.0552 m$^3$/hr). Then the run was started.

Operating conditions that were employed in these tests were as follows: an outlet temperature of 930° F. (499° C.); a pressure of 300 psig (2,170 KPa); a WHSV of 2.3 gm of hydrocarbon per hour per gm of catalyst; and a hydrogen-to-hydrocarbon mole ratio of 5. In each case, a 20-gm sample of catalyst was employed.

Figure 2:
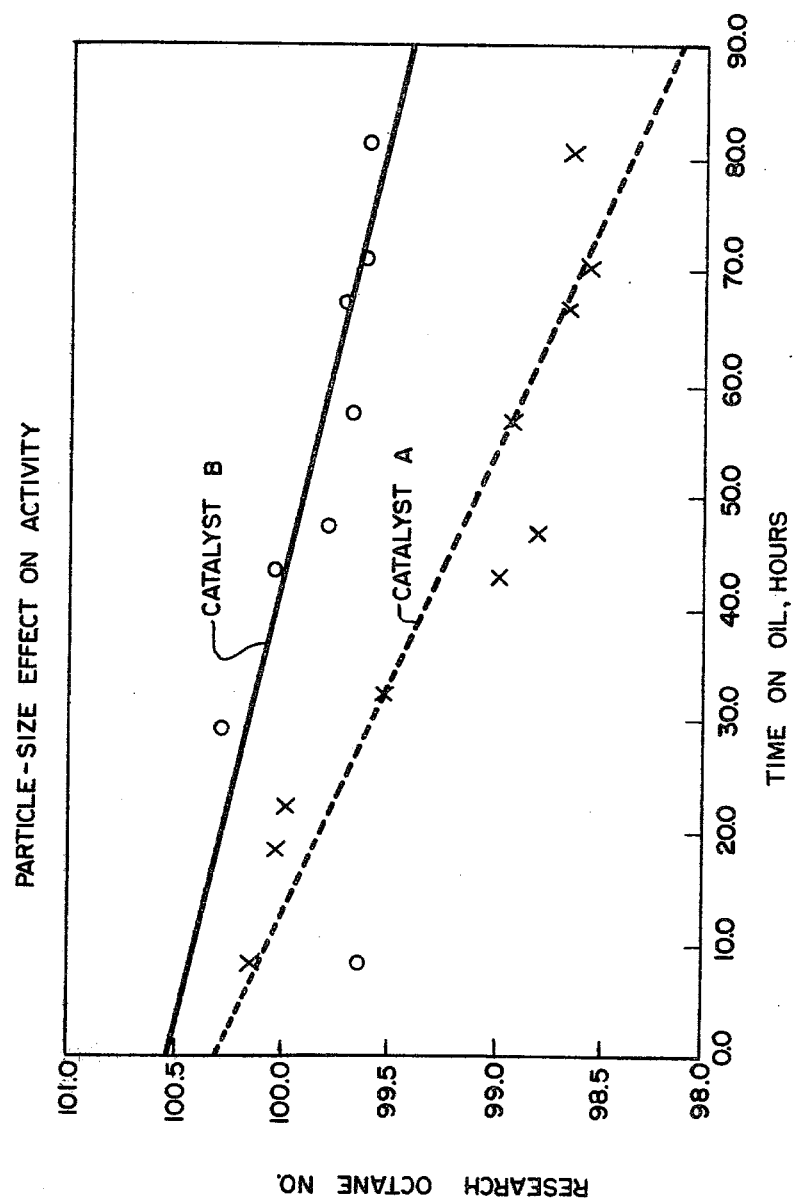
FIG. 2 presents the effect of particle size on activity maintenance, comparing a catalyst that had been prepared by using −100-mesh particles, i.e., particles that will pass through a 100-mesh screen (U.S. Sieve Series), with a catalyst that had been prepared from 20/45-mesh particles, i.e., particles that will pass through a 20-mesh screen (U.S. Sieve Series) but will be retained on a 45-mesh screen (U.S. Sieve Series).

FIG. 2 shows the effect of particle size on activity maintenance. Catalyst A, which was 20/45-mesh material, was compared to Catalyst B, which was prepared by compositing —100-mesh particles and then forming 20/45-mesh particles.

Catalyst A was tested in Test No. 1 for its ability to reform Feed A. Catalyst B was tested in Test No. 2 for its ability to reform Feed A. The results of these tests are presented in Tables II and III, respectively, and in FIG. 2. The time on oil represents the time consumed during all of the periods for preceding samples plus one-half of the time of the period during which the particular sample was obtained. The research octane number was obtained by using a gas-chromatographic correlation.

TABLE II

| DATA OBTAINED FROM TEST NO. 1 CATALYST A; FEED A | | | | |
|---|---|---|---|---|
| Time on | Research | Yields, wt. % | | |
| Oil, hours | Octane No. | Paraffins | Aromatics | Total |
| 8.2 | 100.1 | 20.1 | 59.3 | 79.4 |
| 18.2 | 100.0 | 20.4 | 59.6 | 80.0 |
| 22.0 | 100.0 | 20.6 | 59.8 | 80.4 |
| 32.0 | 99.5 | 21.4 | 59.7 | 81.1 |
| 42.4 | 100.0 | 22.3 | 58.6 | 80.9 |
| 46.3 | 98.8 | 22.4 | 58.1 | 80.5 |
| 56.1 | 98.9 | 22.3 | 59.3 | 81.6 |
| 66.1 | 98.7 | 22.7 | 58.2 | 80.9 |
| 69.7 | 98.6 | 23.2 | 58.3 | 81.6 |
| 79.8 | 98.7 | 22.9 | 58.8 | 81.7 |

TABLE III

| DATA OBTAINED FROM TEST NO. 2 CATALYST B; FEED A | | | | |
|---|---|---|---|---|
| Time on | Research | Yields, wt. % | | |
| Oil, hours | Octane No. | Paraffins | Aromatics | Total |
| 8.4 | 99.6 | 21.3 | 56.0 | 77.3 |
| 28.9 | 100.3 | 19.9 | 57.7 | 77.6 |
| 43.0 | 100.0 | 20.4 | 57.1 | 77.5 |
| 46.7 | 99.8 | 21.5 | 57.4 | 78.9 |
| 56.6 | 99.7 | 21.2 | 57.1 | 78.3 |
| 66.6 | 99.7 | 21.2 | 57.1 | 78.3 |
| 70.4 | 99.6 | 21.2 | 56.4 | 77.6 |
| 80.5 | 99.6 | 21.4 | 57.3 | 78.7 |

These results indicate that the catalyst that was prepared by blending —100-mesh particles to form the composite and subsequently forming the composite into larger particles furnished better octane-number maintenance.

Figure 3:
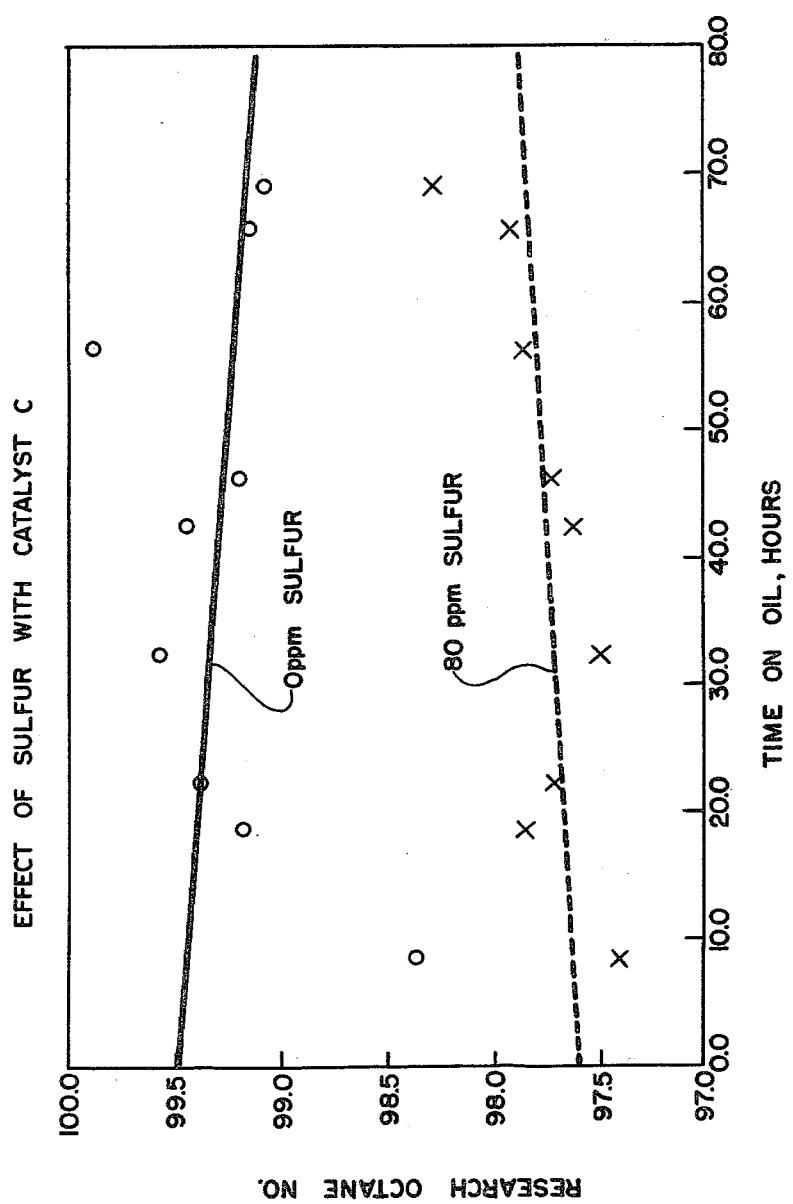
FIGS. 3 and 4 show the effect of sulfur in the feed when the feed is being reformed over a catalyst that had been prepared by compositing −325-mesh particles, i.e., particles that will pass through a 325-mesh screen (U.S. Sieve Series), and a catalyst that had been prepared by compositing 100/325-mesh particles, respectively, the 100/325-mesh particles being particles that will pass through a 100-mesh screen (U.S. Sieve Series) but will be retained on a 325-mesh screen (U.S. Sieve Series).

FIG. 3 shows the effect of sulfur in the feed when that feed is being reformed over a catalyst of the invention, i.e., Catalyst C. Catalyst C was prepared by compositing —325-mesh particles and then forming 20/45-mesh particles for use in the reforming tests, Test No. 3 and Test No. 4. Feed A was employed in Test No. 3; Feed B, in Test No. 4. The results of these tests are presented in Tables IV and V, respectively, and in FIG. 3.

TABLE IV

| DATA OBTAINED FROM TEST NO. 3 CATALYST C; FEED A | | | | |
|---|---|---|---|---|
| Time on | Research | Yields, wt. % | | |
| Oil, hours | Octane No. | Paraffins | Aromatics | Total |
| 8.4 | 98.4 | 24.1 | 57.3 | 81.4 |
| 18.7 | 99.2 | 22.3 | 59.8 | 82.1 |
| 22.4 | 99.4 | 22.2 | 60.2 | 82.4 |
| 32.5 | 99.6 | 21.7 | 60.1 | 81.8 |
| 42.4 | 99.4 | 21.8 | 59.7 | 81.5 |
| 46.2 | 99.2 | 22.6 | 59.0 | 81.6 |
| 56.3 | 99.9 | 20.2 | 61.3 | 81.5 |
| 65.7 | 99.1 | 22.2 | 58.8 | 81.0 |
| 68.9 | 99.1 | 22.9 | 59.3 | 82.2 |

TABLE V

| DATA OBTAINED FROM TEST NO. 4 CATALYST C; FEED B | | | | |
|---|---|---|---|---|
| Time on | Research | Yields, wt. % | | |
| Oil, hours | Octane No. | Paraffins | Aromatics | Total |
| 8.4 | 97.4 | 25.8 | 55.8 | 81.6 |
| 18.7 | 97.9 | 25.1 | 56.8 | 81.9 |
| 22.4 | 97.7 | 25.1 | 57.1 | 82.2 |

TABLE V-continued

DATA OBTAINED FROM TEST NO. 4
CATALYST C; FEED B

| Time on Oil, hours | Research Octane No. | Yields, wt. % | | |
|---|---|---|---|---|
| | | Paraffins | Aromatics | Total |
| 32.5 | 97.5 | 25.4 | 57.3 | 82.7 |
| 42.4 | 97.6 | 24.4 | 58.5 | 82.9 |
| 46.2 | 97.7 | 23.9 | 58.3 | 82.2 |
| 56.3 | 97.9 | 23.8 | 59.3 | 83.1 |
| 65.7 | 97.9 | 22.9 | 59.6 | 82.5 |
| 68.9 | 98.3 | 22.8 | 59.4 | 82.2 |

The results from Test No. 3 and Test No. 4 show that the 80 ppm of sulfur in the feed had a deleterious effect upon octane number, but showed a slight increase in octane number as the tests progressed. Total yields were not appreciably changed.

Figure 4:
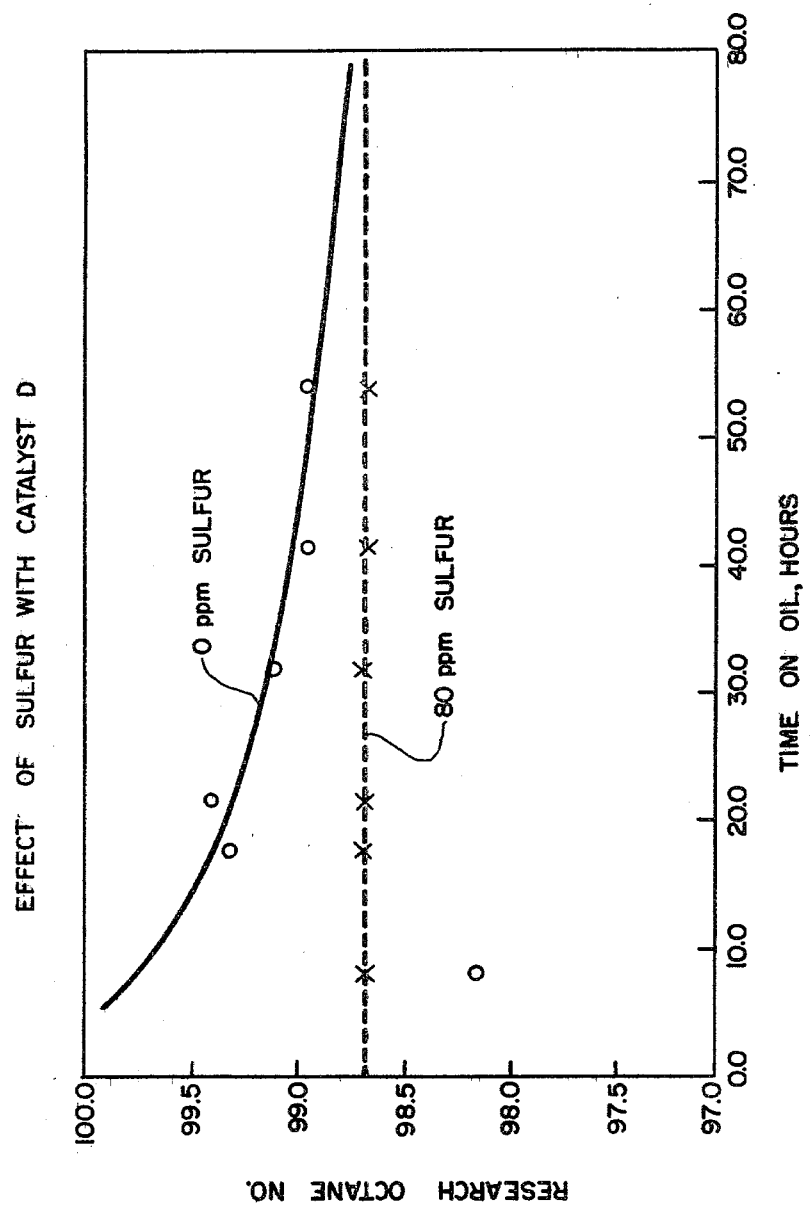

FIG. 4 shows the effect of sulfur in the feed when that feed is being reformed over Catalyst D, a catalyst that was prepared by compositing 100/325-mesh particles, i.e., particles that will pass through a 100-mesh screen (U.S. Seive Series) but will be retained on a 325-mesh screen (U.S. Sieve Series), and then forming 20/45-mesh particles for use in the reforming tests. Feed A was used in Test No. 5; Feed B, in Test No. 6. The results of these tests are shown in Tables VI and VII, respectively, and in FIG. 4.

TABLE VI

DATA OBTAINED FROM TEST NO. 5
CATALYST D; FEED A

| Time on Oil, hours | Research Octane No. | Yields, wt. % | | |
|---|---|---|---|---|
| | | Paraffins | Aromatics | Total |
| 8.2 | 98.2 | 23.0 | 59.4 | 82.4 |
| 17.9 | 99.3 | 21.7 | 61.5 | 83.2 |
| 21.7 | 99.4 | 21.6 | 60.6 | 82.2 |
| 32.1 | 99.1 | 22.2 | 60.2 | 82.4 |
| 41.5 | 98.9 | 22.1 | 60.6 | 82.7 |
| 53.9 | 98.9 | 22.8 | 60.3 | 83.1 |

TABLE VII

DATA OBTAINED FROM TEST NO. 6
CATALYST D; FEED B

| Time on Oil, hours | Research Octane No. | Yields, wt. % | | |
|---|---|---|---|---|
| | | Paraffins | Aromatics | Total |
| 8.1 | 98.7 | 22.8 | 59.1 | 81.9 |
| 17.8 | 98.7 | 23.2 | 60.3 | 83.5 |
| 21.6 | 98.7 | 23.0 | 59.7 | 82.7 |
| 31.9 | 98.7 | 22.9 | 59.9 | 82.8 |
| 41.3 | 98.7 | 22.6 | 60.7 | 83.3 |
| 53.7 | 98.7 | 23.0 | 60.0 | 83.0 |

The results from Test No. 5 and Test No. 6 show that the 80 ppm sulfur in the feed did provide a lower initial research octane number; however, there was no decline in octane number during the test. Furthermore, the octane difference between Test No. 5 and Test No. 6 as seen in FIG. 4 is less than the octane difference between Test No. 3 and Test No. 4 as seen in FIG. 3. Hence, sulfur poisoning of Catalyst D was less than that of Catalyst C. Catalyst D, which was made with 100/325-mesh particles, is a preferred embodiment of the catalyst of the present invention and can be used to reform a feed containing up to 80 ppm sulfur.

EXAMPLE VI

A catalyst of the prior art was prepared by forming a composite of four samples of commercially-prepared platinum-rhenium reforming catalysts, which had been obtained from the American Cyanamid Company in the form of 1/12-inch extrudates. Each of the four samples that were used to make up this composite was said by the manufacturer to contain 0.37 wt.% platinum and 0.37 wt.% rhenium on gamma-alumina. The resultant composite was adjusted for combined chlorine content by impregnation thereof with an aqueous hydrochloric acid solution, dried, and calcined as described hereinabove. The impregnated composite was found to contain 0.8 wt.% combined chlorine. This catalyst is identified hereinafter as Catalyst F.

EXAMPLE VII

Catalyst E and Catalyst F were tested individually in a large-scale reforming pilot plant unit for their abilities to reform Feed C, which contains 15 ppm sulfur. Catalyst E was studied in Test No. 7; Catalyst F, in Test No. 8. The results of these tests are presented in Tables VIII and IX, respectively, and in FIGS. 5, 6, and 7.

The pilot plant unit was constructed in a modular fashion to facilitate replacement of an entire section, e.g., reactor, feed, or product recovery. It was designed for complete computer monitoring and limited computer control capabilities. A major portion of its operation is fully automatic.

The reactor section contained a preheater section, a reactor fabricated from 1-inch pipe, a high pressure separator, and a recycle system. In the preheater, the feed was vaporized and heated to a gaseous mixture of hydrogen and hydrocarbons at a temperature within the range of about 600° F. (316° C.) to about 700° F. (371° C.). The three catalyst beds in the reactor were operated adiabatically. The first bed was 6 inches long and was supported by a 6-inch bed of ⅛-inch alumina balls. The second and third beds were each 9 inches in length and each was supported by a 9-inch bed of ⅛-inch alumina balls. The catalyst beds were employed serially. A 100-gram portion of Catalyst E was tested in Test No. 7, while 100 grams of Catalyst F were employed in Test No. 8. Catalyst E was used in the form of 6/10-mesh (3.35 mm-to-2 mm) spheres. Catalyst F was used in the form of 1/12-inch extrudates. Alumina balls, ⅛ inch in diameter, were used to pack the preheated and reheated zones. A co-axial thermowell was used for guiding the traveling thermocouple, which was used to obtain the actual temperature prevailing in the reactor catalyst beds. The end closure flanges of the reactor were cooled by means of cooling water jackets.

The hot effluent from the reactor was partially condensed in a water condenser at the outlet of the reactor and the liquid reformate was separated from the hydrogen rich gas in a high-pressure separator. Liquid leaving the high-pressure separator was stabilized. Gas volume was measured by wet test meters. Periodic onstream gas analysis was provided by gas chromatographic techniques.

Test conditions employed for each test included: a pressure of 250 psig (1,827 KPa), a recycle rate of 3,000 SCFB, a WHSV of 5.9 grams of hydrocarbon per hour per gram of catalyst, a kinetic average temperature of 960° F. (516° C.), and a hydrogen-to-hydrocarbon mole ratio of 3.0.

Research octane numbers were measured by a test engine.

The catalyst of this test was presulfided as follows: The catalyst was heated over a period of 1 hr to a temperature of 700° F. (371° C.) in air at an air rate of about 5 ft³/hr (0.142 m³/hr) and held at that temperature for 1 hr. Then the reactor was purged with nitrogen for 10 minutes and treated with hydrogen for 15 minutes at a temperature of 700° F. (371° C.) and a hydrogen rate of about 8 ft³/hr (0.227 m³/hr). With hydrogen flowing upward through the reactor, 0.15 cc of dimethyldisulfide (DMDS) was injected into the system. After 10 minutes, hydrogen flow at the same rate was reversed and another 0.15 cc of DMDS was injected into the system, this time from the opposite end of the reactor. After another 10 minutes, the reactor was pressured with a mixture of methane and hydrogen, containing about 72 vol.% methane, to operating pressure, recycle of the methane-hydrogen mixture at a rate of 3,000 SCFB (534 m³/m³) was started, and oil was introduced into the system.

Figure 5:
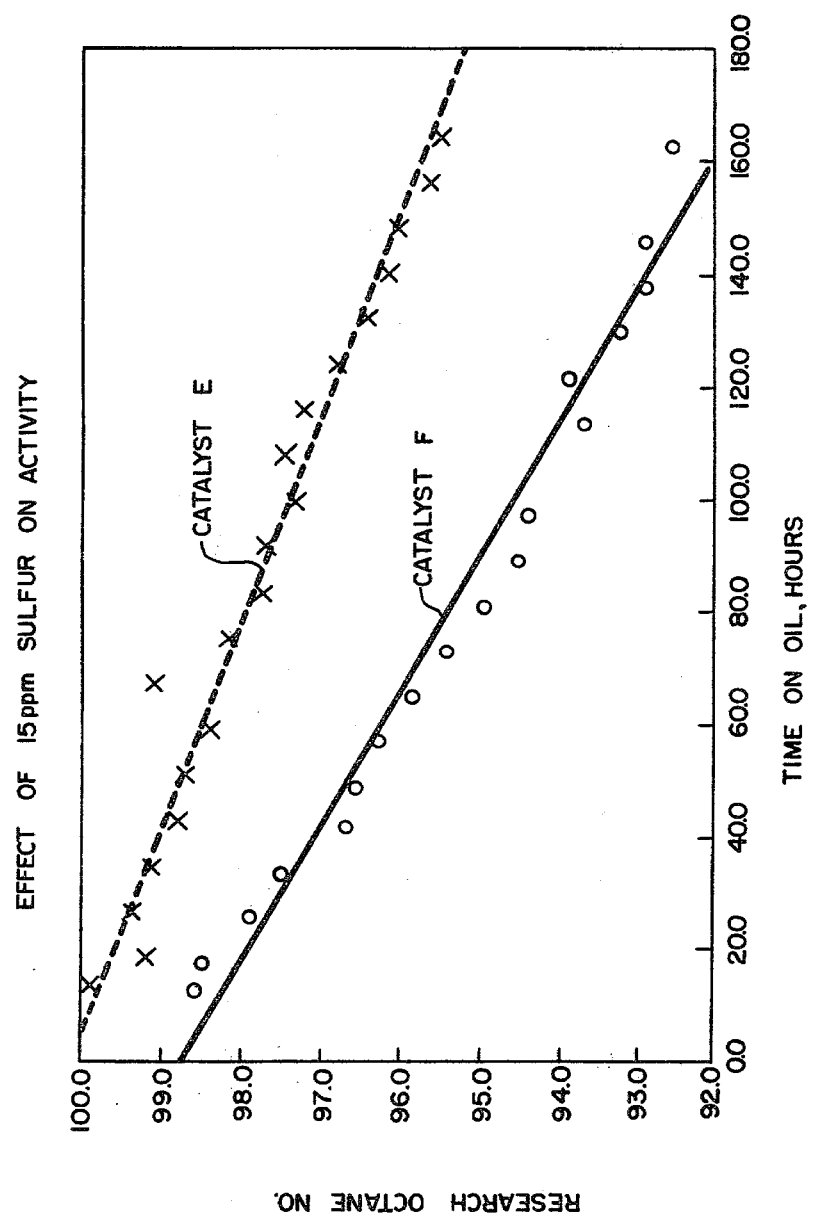
FIGS. 5, 6, and 7 show the effect of 15 ppm sulfur on octane number, aromatics yields, and $C_5+$ yields, respectively, when reforming with a catalyst that had been prepared by compositing −100-mesh particles, as well as with a prior-art catalyst.
Figure 6:
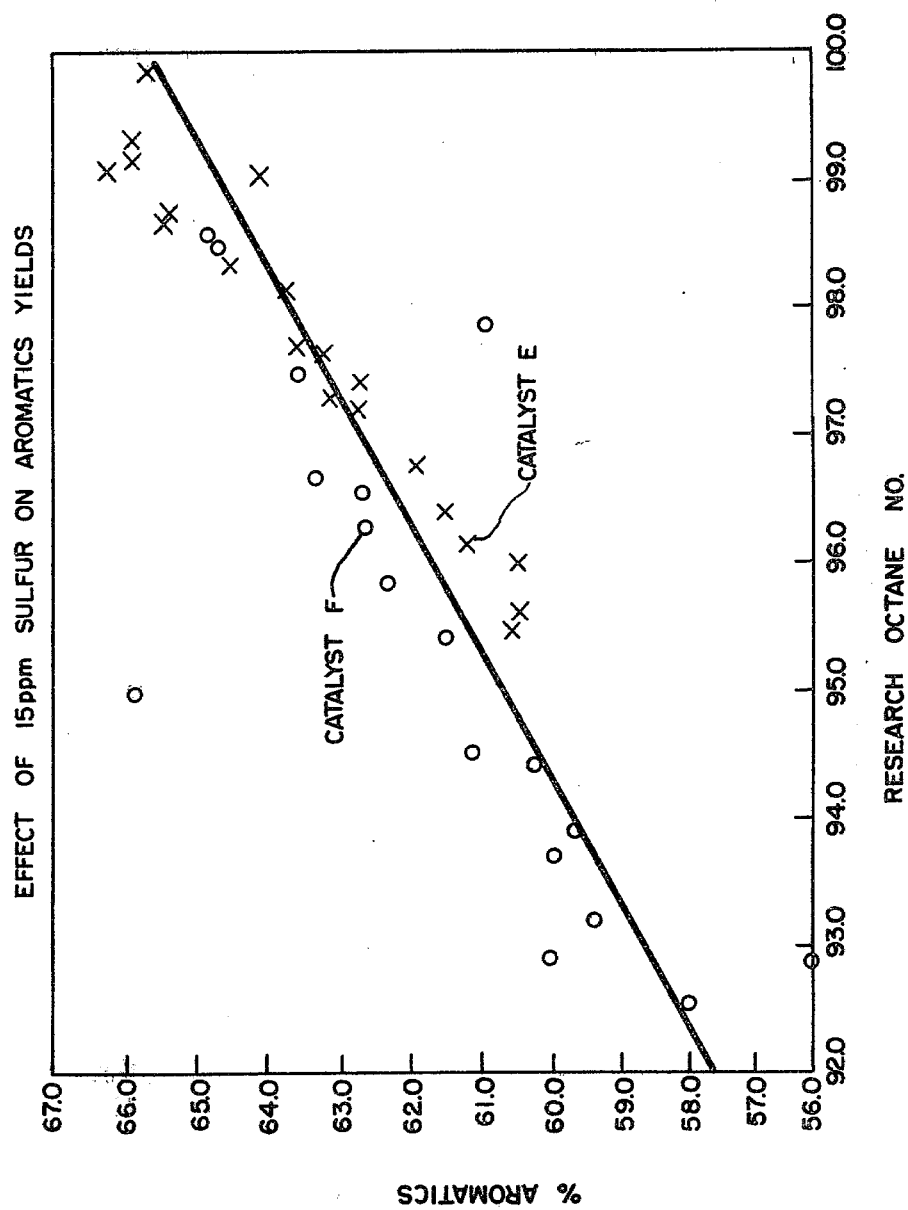
Figure 7:
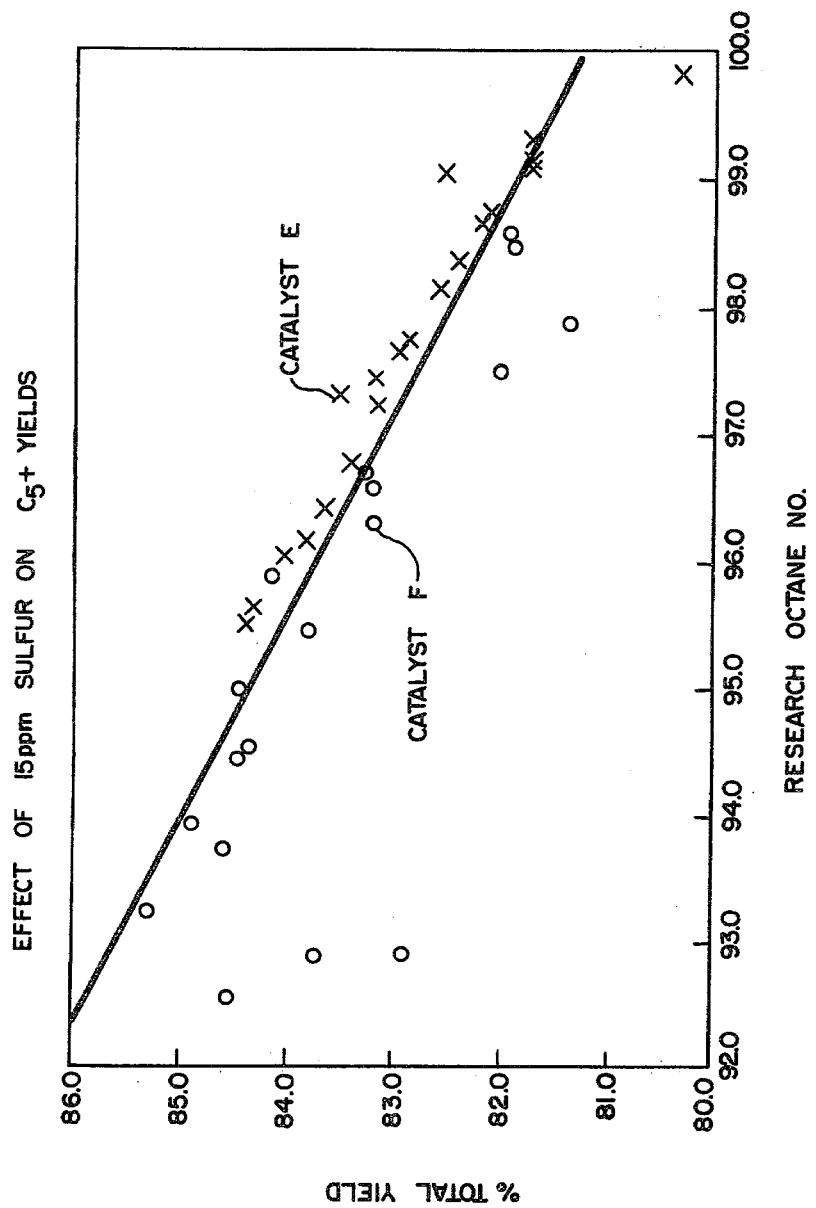

The results obtained from Test No. 7 and Test No. 8 are presented in Table VIII and Table IX, respectively, and the effects of the 15-ppm sulfur level on research octane number, aromatics yields, and $C_5+$ yields are presented in FIGS. 5, 6, and 7, respectively.

TABLE VIII

DATA OBTAINED FROM TEST NO. 7
CATALYST E; FEED C

| Time on Oil, hours | Research Octane No. | Yields, wt. % | |
|---|---|---|---|
| | | $C_5+$ | Aromatics |
| 13.4 | 99.8 | 80.3 | 65.6 |
| 18.4 | 99.1 | 81.7 | 65.8 |
| 26.4 | 99.3 | 81.7 | 65.8 |
| 34.4 | 99.1 | 81.7 | 66.1 |
| 42.4 | 98.7 | 82.1 | 65.2 |
| 50.5 | 98.7 | 82.2 | 65.3 |
| 58.5 | 98.3 | 82.4 | 64.4 |
| 66.5 | 99.0 | 82.5 | 64.0 |
| 74.4 | 98.1 | 82.6 | 63.6 |
| 82.5 | 97.7 | 82.9 | 63.5 |
| 90.5 | 97.6 | 83.0 | 63.2 |
| 98.5 | 97.3 | 83.5 | 63.1 |
| 106.5 | 97.4 | 83.2 | 62.6 |
| 114.5 | 97.2 | 83.2 | 62.7 |
| 122.5 | 96.8 | 83.4 | 61.9 |
| 130.5 | 96.4 | 83.7 | 61.6 |
| 138.5 | 96.1 | 83.8 | 61.2 |
| 146.4 | 96.0 | 84.0 | 60.5 |
| 154.4 | 95.6 | 84.3 | 60.5 |
| 162.4 | 95.5 | 84.4 | 60.6 |

TABLE IX

DATA OBTAINED FROM TEST NO. 8
CATALYST F; FEED C

| Time on Oil, hours | Research Octane No. | Yields, wt. % | |
|---|---|---|---|
| | | $C_5+$ | Aromatics |
| 12.5 | 98.6 | 82.0 | 64.7 |
| 17.5 | 98.5 | 81.9 | 64.6 |
| 25.5 | 97.9 | 81.4 | 60.9 |
| 33.5 | 97.5 | 82.1 | 63.5 |
| 41.5 | 96.7 | 83.3 | 63.3 |
| 48.5 | 96.6 | 83.2 | 62.6 |
| 56.5 | 96.3 | 83.2 | 62.6 |
| 64.5 | 95.9 | 84.1 | 62.3 |
| 72.5 | 95.4 | 83.8 | 61.5 |
| 80.5 | 95.0 | 84.4 | 65.8 |
| 88.5 | 94.5 | 84.4 | 61.1 |
| 96.5 | 94.4 | 84.5 | 60.3 |
| 112.5 | 93.7 | 84.6 | 60.0 |
| 128.5 | 93.2 | 85.3 | 59.4 |
| 120.5 | 93.9 | 84.9 | 59.7 |
| 136.5 | 92.9 | 82.9 | 56.0 |
| 144.4 | 92.9 | 83.7 | 57.3 |
| 161.2 | 92.6 | 84.5 | 58.0 |

The results that were obtained from Test No. 7 and Test No. 8 demonstrate that the Catalyst E, which had been prepared from a spray-dried alumina containing 65 wt.% 100/325-mesh particles and 35 wt.% −325-mesh particles, provided a research octane number that was greater than that provided by Catalyst F, the prior-art catalyst, and an octane-number decline that was smaller than that furnished by the prior-art catalyst. This is clearly shown in FIG. 5. The aromatics yields and $C_5+$ yields obtained with the two catalysts in Tests Nos. 7 and 8 were quite similar, as shown in FIG. 6 and FIG. 7.

EXAMPLE VIII

Figure 8:
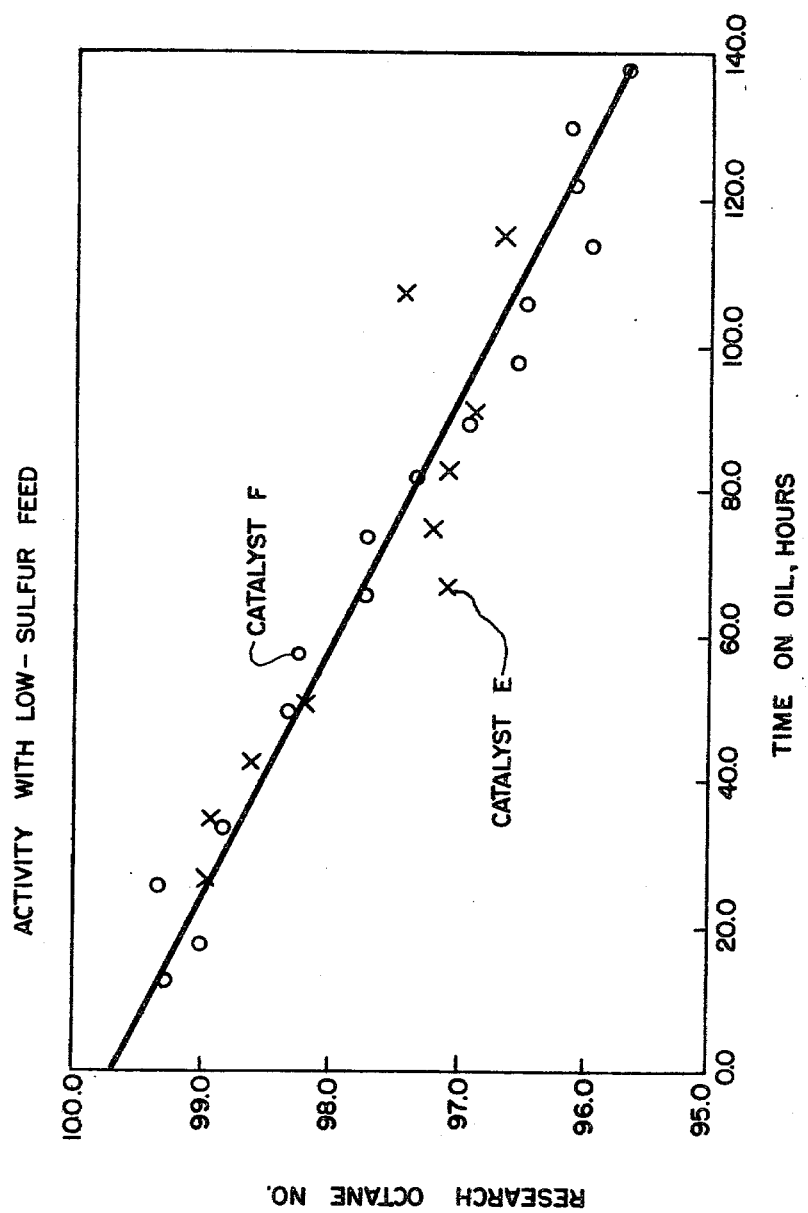

Catalyst E and Catalyst F were tested individually in large-scale reforming pilot plant units similar to that employed in Example VII. In this Example, Feed A, which is a low-sulfur feed, was employed. A 90-gram portion of Catalyst E was tested in Test No. 9; a 100-gram portion of Catalyst F, in Test No. 10. Presulfiding of the catalysts was conducted in a manner similar to that described in Example VII hereinabove. The results of these tests are presented in Tables X and XI, respectively, and the octane number decline, aromatics yields, and $C_5+$ yields are presented in FIGS. 8, 9, and 10, respectively.

TABLE X

DATA OBTAINED FROM TEST NO. 9
CATALYST E; FEED A

| Time on Oil, hours | Research Octane No. | Yields, wt. % | |
|---|---|---|---|
| | | $C_5+$ | Aromatics |
| 26.5 | 99.0 | 82.1 | 66.6 |
| 34.5 | 98.9 | 82.2 | 66.8 |
| 42.4 | 98.6 | 82.1 | 66.0 |
| 50.5 | 98.2 | 82.4 | 65.5 |
| 66.5 | 97.1 | 82.9 | 64.4 |
| 74.5 | 97.2 | 83.2 | 64.2 |
| 82.5 | 97.1 | 83.2 | 64.2 |
| 90.5 | 96.9 | 83.4 | 64.1 |
| 106.5 | 97.5 | 83.3 | 64.5 |
| 114.5 | 96.7 | 84.0 | 58.2 |

Figure 9:
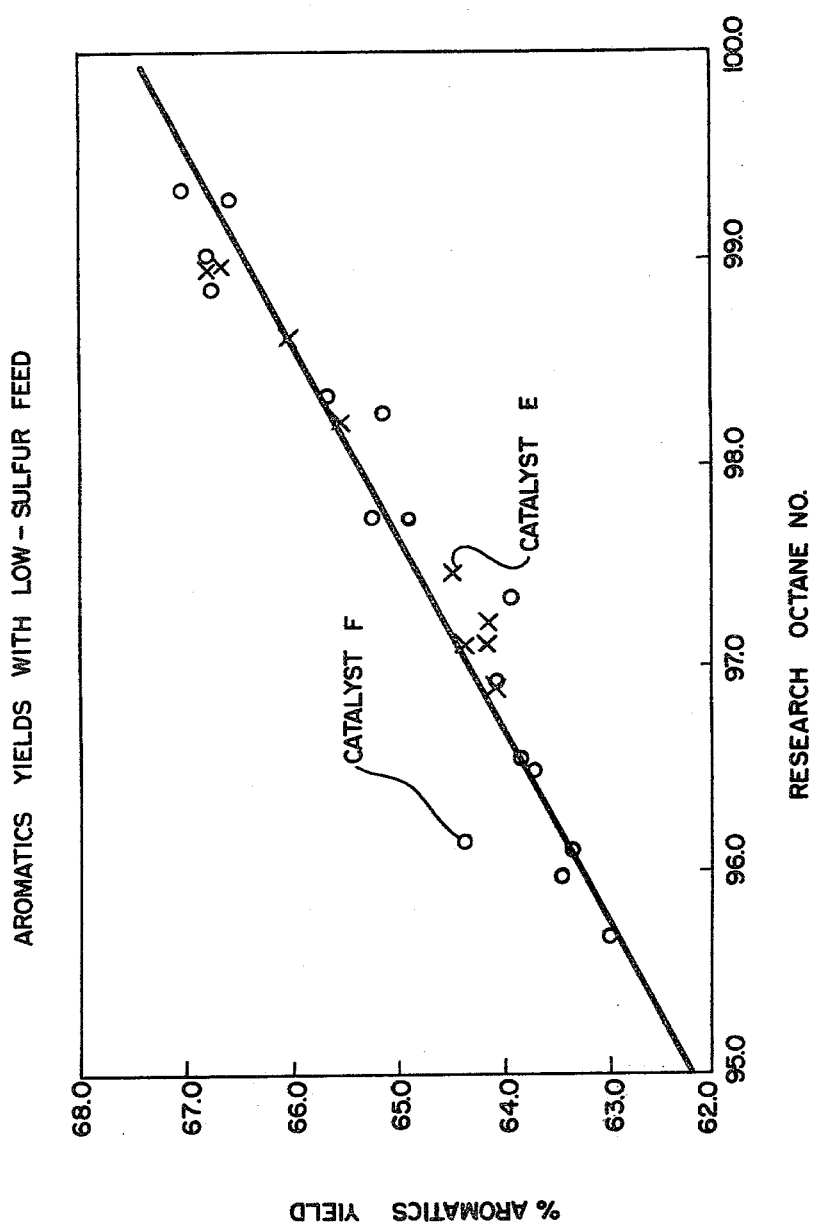

The last value for % aromatics in Table X is obviously a maverick and, therefore, was not used in the linear regression of the data for FIG. 9.

TABLE XI

DATA OBTAINED FROM TEST NO. 10
CATALYST F; FEED A

| Time on Oil, hours | Research Octane No. | Yields, wt. % | |
|---|---|---|---|
| | | $C_5+$ | Aromatics |
| 12.5 | 99.3 | 82.2 | 66.6 |
| 17.5 | 99.0 | 82.7 | 66.8 |
| 25.5 | 99.3 | 82.8 | 67.0 |
| 33.5 | 98.8 | 82.9 | 66.7 |
| 49.5 | 98.3 | 83.0 | 65.7 |
| 57.4 | 98.2 | 83.4 | 65.1 |
| 65.4 | 97.7 | 83.5 | 64.9 |
| 73.4 | 97.7 | 83.8 | 65.2 |
| 81.4 | 97.3 | 83.6 | 64.0 |
| 89.4 | 96.9 | 83.7 | 64.1 |
| 97.4 | 96.6 | 84.1 | 63.9 |
| 105.4 | 96.5 | 84.0 | 63.7 |
| 113.4 | 96.0 | 84.3 | 63.5 |
| 121.5 | 96.1 | 84.1 | 63.4 |
| 129.5 | 96.1 | 84.0 | 64.4 |
| 137.5 | 95.7 | 84.4 | 63.0 |

The results obtained from Test No. 9 and Test No. 10 indicate that in the case of the low-sulfur feed, i.e., Feed A, similar research octane numbers and similar yields were obtained with Catalyst E and Catalyst F. Hence, they provided similar activities and similar selectivities.

Comparison of the data obtained from Tests Nos. 7 through 10 suggests that Catalyst E, an embodiment of the catalyst of the present invention, provided a greater research octane number and a lower octane-number decline, when treating the sulfur-containing feed, Feed C, than did the prior-art catalyst, Catalyst F. In addition, Catalyst E did not lose activity as a result of the higher sulfur level. In other words, Catalyst E was able to tolerate a 15-ppm sulfur level without appreciable activity loss. However, the prior-art catalyst, Catalyst F, was deleteriously affected by the 15 ppm sulfur in the feed. In addition, losses in both $C_5+$ yields and aromatics yields were found to be essentially equivalent for the two catalysts. In view of this, the impact of a sulfur upset in the reforming system can be lessened by using the catalyst and process of the present invention.

What is claimed is:

1. A catalyst comprising a physical particle-form mixture of a Component A and a Component B, said Component A comprising at least one Group VIII noble metal deposed on a solid catalyst support material providing acidic catalytic sites and said Component B comprising rhenium or a compound of rhenium deposed on a solid catalyst support material, said catalyst having been prepared by thoroughly and intimately blending finely-divided particles of Component A and Component B to provide a thoroughly-blended composite, said finely-divided particles having a particle diameter that is less than 100 mesh (150 microns), and forming subsequently said composite into particles having a size that is greater than 100 mesh (150 microns) and being suitable for use in a hydrocarbon conversion reaction zone.

2. The catalyst of claim 1, wherein said finely-divided particles have a particle diameter that is less than 100 mesh (150 microns) and greater than 325 mesh (45 microns).

3. The catalyst of claim 1, wherein said support material of Component A and said support material of Component B each comprises alumina and a combined halogen.

4. The catalyst of claim 1, wherein said Group VIII noble metal is platinum and is present in an amount within the range of about 0.1 wt.% to about 3 wt.%, calculated as the element and based upon the weight of Component A, and said rhenium is present in an amount within the range of about 0.1 wt.% to about 4 wt.%, calculated as the element and based upon the weight of Component B.

5. The catalyst of claim 1, wherein said Component A is present in an amount within the range of about 10 wt.% to about 90 wt.%, based upon the weight of said catalyst.

6. The catalyst of claim 2, wherein said support material of Component A and said support material of Component B each comprises alumina and a combined halogen.

7. The catalyst of claim 2, wherein said Group VIII noble metal is platinum and is present in an amount within the range of about 0.1 wt.% to about 3 wt.%, calculated as the element and based upon the weight of Component A, and said rhenium is present in an amount within the range of about 0.1 wt.% to about 4 wt.%, calculated as the element and based upon the weight of Component B.

8. The catalyst of claim 2, wherein said Component A is present in an amount within the range of about 10 wt.% to about 90 wt.%, based upon the weight of said catalyst.

9. The catalyst of claim 3, wherein said halogen is chlorine and is present in an amount within the range of about 0.1 wt.% to about 4 wt.%, calculated as the element and based upon the weight of the catalyst.

10. The catalyst of claim 3, wherein said Group VIII noble metal is platinum and is present in an amount within the range of about 0.1 wt.% to about 3 wt.%, calculated as the element and based upon the weight of Component A, and said rhenium is present in an amount within the range of about 0.1 wt.% to about 4 wt.%, calculated as the element and based upon the weight of Component B.

11. The catalyst of claim 4, wherein said Component A is present in an amount within the range of about 10 wt.% to about 90 wt.%, based upon the weight of said catalyst.

12. The catalyst of claim 6, wherein said halogen is chlorine and is present in an amount within the range of about 0.1 wt.% to about 4 wt.%, calculated as the element and based upon the weight of the catalyst.

13. The catalyst of claim 6, wherein said Group VIII noble metal is platinum and is present in an amount within the range of about 0.1 wt.% to about 3 wt.%, calculated as the element and based upon the weight of Component A, and said rhenium is present in an amount within the range of about 0.1 wt.% to about 4 wt.%, calculated as the element and based upon the weight of Component B.

14. The catalyst of claim 6, wherein said Component A is present in an amount within the range of about 10 wt.% to about 90 wt.%, based upon the weight of said catalyst.

15. The catalyst of claim 9, wherein said Group VIII noble metal is platinum and is present in an amount within the range of about 0.1 wt.% to about 3 wt.%, calculated as the element and based upon the weight of Component A, and said rhenium is present in an amount within the range of about 0.1 wt.% to about 4 wt.%, calculated as the element and based upon the weight of Component B.

16. The catalyst of claim 9, wherein said Component A is present in an amount within the range of about 10 wt.% to about 90 wt.%, based upon the weight of said catalyst.

17. The catalyst of claim 12, wherein said Group VIII noble metal is platinum and is present in an amount within the range of about 0.1 wt.% to about 3 wt.%, calculated as the element and based upon the weight of Component A, and said rhenium is present in an amount within the range of about 0.1 wt.% to about 4 wt.%, calculated as the element and based upon the weight of Component B.

18. The catalyst of claim 12, wherein said Component A is present in an amount within the range of about 10 wt.% to about 90 wt.%, based upon the weight of said catalyst.

19. The catalyst of claim 13, wherein said Component A is present in an amount within the range of about 10 wt.% to about 90 wt.%, based upon the weight of said catalyst.

20. The catalyst of claim 15, wherein said Component A is present in an amount within the range of about 10 wt.% to about 90 wt.%, based upon the weight of said catalyst.

21. The catalyst of claim 15, wherein said platinum is present in an amount within the range of about 1 wt.% to about 2 wt.%, calculated as the element and based upon the weight of Component A, said rhenium is present in an amount within the range of about 1 wt.% to about 3 wt.%, calculated as the element and based upon the weight of Component B, and said chlorine is present in an amount within the range of about 1 wt.% to about 3 wt.%, calculated as the element and based upon the weight of the catalyst.

22. The catalyst of claim 17, wherein said Component A is present in an amount within the range of about 10 wt.% to about 90 wt.%, based upon the weight of said catalyst.

23. The catalyst of claim 17, wherein said platinum is present in an amount within the range of about 1 wt.% to about 2 wt.%., calculated as the element and based upon the weight of Component A, said rhenium is present in an amount within the range of about 1 wt.% to about 3 wt.%, calculated as the element and based upon the weight of Component B, and said chlorine is present in an amount within the range of about 1 wt.% to about 3 wt.%, calculated as the element and based upon the weight of the catalyst.

24. The catalyst of claim 20, wherein said platinum is present in an amount within the range of about 1 wt.% to about 2 wt.%, calculated as the element and based upon the weight of Component A, said rhenium is present in an amount within the range of about 1 wt.% to about 3 wt.%, calculated as the element and based upon the weight of Component B, and said chlorine is present in an amount within the range of about 1 wt.% to about 3 wt.%, calculated as the element and based upon the weight of the catalyst.

25. The catalyst of claim 22, wherein said platinum is present in an amount within the range of about 1 wt.% to about 2 wt.%, calculated as the element and based upon the weight of Component A, said rhenium is present in an amount within the range of about 1 wt.% to about 3 wt.%, calculated as the element and based upon the weight of Component B, and said chlorine is present in an amount within the range of about.1 wt.% to about 3 wt.%, calculated as the element and based upon the weight of the catalyst.

* * * * *

UNITED STATES PATENT OFFICE
CERTIFICATE OF CORRECTION

Patent No. 4,302,358    Dated November 24, 1981

Inventor(s) Regis J. Pellet and Ralph J. Bertolacini

It is certified that error appears in the above-identified patent and that said Letters Patent are hereby corrected as shown below:

Column 3, line 21, "silicaalumina" should be
    -- silica-alumina --.

Column 3, line 22, "silicamagnesia" should be
    -- silica-magnesia --.

Column 4, lines 20 and 21, "platinumr-henium" should be
    -- platinum-rhenium --.

Column 6, line 50, "materials" should be
    -- material --.

Column 6, line 67, "[A]" should be -- [Å] --.

Column 6, line 68, "200 A" should be -- 200 Å --.

Column 9, line 16, "catalyst the" should be
    --catalyst of the --.

Column 9, line 63, "a bout" should be -- about --.

Column 10, line 15, "hydogen-hydrocarbon" should be
    -- hydrogen-hydrocarbon --.

Column 11, line 57, "followng" should be -- following --.

Column 12, line 10, "frm" should be -- from --.

Column 12, line 13, "sieve" should be -- sieved --.

Column 12, line 15, "-100-amesh" should be -- 100-mesh --.

UNITED STATES PATENT OFFICE
CERTIFICATE OF CORRECTION

Patent No. 4,302,358     Dated November 24, 1981

Inventor(s) Regis J. Pellet and Ralph J. Bertolacini

It is certified that error appears in the above-identified patent and that said Letters Patent are hereby corrected as shown below:

Column 12, line 23, "impregnted" should be
-- impregnated --.

Column 13, line 20, "Seive" should be -- Sieve --.

Column 14, line 45, "one to two" should be -- one or two --.

Column 17, line 22, "(U.S. Seive Series)" should be --(U.S. Sieve Series) --.

Column 17, line 31, "Yields. wt.%" should be
-- Yields, wt.% --.

Column 20, line 2, "priorart" should be -- prior-art --.

Signed and Sealed this

Nineteenth Day of October 1982

[SEAL]

Attest:

GERALD J. MOSSINGHOFF

Attesting Officer     Commissioner of Patents and Trademarks